US012608000B2

(12) United States Patent
Smith et al.

(10) Patent No.: US 12,608,000 B2
(45) Date of Patent: Apr. 21, 2026

(54) SYSTEM AND METHOD FOR AUTOMATED OPENING OF TRAILER DOORS

(71) Applicant: Outrider Technologies, Inc., Brighton, CO (US)

(72) Inventors: Andrew F. Smith, Bend, OR (US);
Vittorio A. Ziparo, Boulder, CO (US);
Luciano Spinello, San Jose, CA (US);
Ira A. Renfrew, Lexington, MA (US);
Joseph S. DeRose, Denver, CO (US);
Austin Lovan, Wheat Ridge, CO (US);
Lawrence S. Klein, Bend, OR (US);
Martin E. Sotola, Boulder, CO (US);
Mark H. Rosenblum, Denver, CO (US); Matthew S. Johannes, Arvada, CO (US)

(73) Assignee: Outrider Technologies, Inc., Brighton, CO (US)

( * ) Notice: Subject to any disclaimer, the term of this patent is extended or adjusted under 35 U.S.C. 154(b) by 67 days.

(21) Appl. No.: 18/534,684

(22) Filed: Dec. 10, 2023

(65) Prior Publication Data

US 2024/0219904 A1 Jul. 4, 2024

Related U.S. Application Data

(63) Continuation-in-part of application No. 18/378,119, filed on Oct. 9, 2023, now Pat. No. 12,228,925, which
(Continued)

(51) Int. Cl.
G05D 1/00 (2024.01)
B25J 9/16 (2006.01)
(Continued)

(52) U.S. Cl.
CPC .......... G05D 1/0061 (2013.01); B25J 9/1679 (2013.01); B60D 1/015 (2013.01);
(Continued)

(58) Field of Classification Search
CPC ....... G05D 1/0061; B60L 58/12; B60L 53/36; B25J 9/1679; B60D 1/015; B60D 1/26;
(Continued)

(56) References Cited

U.S. PATENT DOCUMENTS 3,881,748 A 5/1975 Donaldson
4,366,965 A 1/1983 Rhodes
(Continued)

FOREIGN PATENT DOCUMENTS

CA 2555212 A1 9/2005
CN 106741239 5/2017
(Continued)

OTHER PUBLICATIONS

'Re: Adapting the gladhand to an airhose'. In Steel Soldiers Military Vehicles Supersite Forums [online], Nov. 24, 2008 [ retrieved on Nov. 4, 2020], Retrieved from the Internet: <https://www.steelsoldiers.com/threads/adapting-the-gladhand-to-an-airhose ,28023/post-292796>. 5 pages. (Year: 2008).
(Continued)

*Primary Examiner* — Gertrude Arthur Jeanglaude
(74) *Attorney, Agent, or Firm* — Loginov & Associates, PLLC; William A. Loginov

(57) ABSTRACT

This invention provides a station for opening trailer swing doors that uses a sled with a manipulator arm and associated end effector/tool to perform the unlocking of the trailer lock rod, swinging open of the door, holding the door in the opened position and applying an resilient/flexible/springy retention clip thereto. The sled moves into and out of a confronting position relative to the trailer rear/doors to allow
(Continued)

that trailer to drive into or out of the station at the beginning or end of the task. Closing of doors can also be performed at the station in the reverse order of steps. The door retention clip can be adapted with features that allow it to perform the various opening and closing tasks herein. The station can include tracks for guiding the sled between a non-interfering and interfering position with respect to the path of travel of the truck/trailer.

30 Claims, 35 Drawing Sheets

Related U.S. Application Data is a continuation of application No. 17/897,327, filed on Aug. 29, 2022, now Pat. No. 11,782,436, which is a continuation of application No. 16/282,258, filed on Feb. 21, 2019, now Pat. No. 11,429,099.

(60) Provisional application No. 62/715,757, filed on Aug. 7, 2018, provisional application No. 62/681,044, filed on Jun. 5, 2018, provisional application No. 62/633,185, filed on Feb. 21, 2018.

(51) Int. Cl.

| | |
|---|---|
| *B60D 1/01* | (2006.01) |
| *B60D 1/26* | (2006.01) |
| *B60D 1/62* | (2006.01) |
| *B60D 1/64* | (2006.01) |
| *B60L 53/36* | (2019.01) |
| *B60L 58/12* | (2019.01) |
| *B60R 1/00* | (2022.01) |
| *B60R 25/04* | (2013.01) |
| *B60R 25/102* | (2013.01) |
| *B60R 25/23* | (2013.01) |
| *B60R 25/25* | (2013.01) |
| *B62D 13/06* | (2006.01) |
| *B62D 15/02* | (2006.01) |
| *B62D 33/02* | (2006.01) |
| *B62D 53/08* | (2006.01) |
| *B62D 53/12* | (2006.01) |
| *B65G 69/00* | (2006.01) |
| *E05B 81/54* | (2014.01) |
| *E05C 17/02* | (2006.01) |
| *B62D 63/08* | (2006.01) |

(52) U.S. Cl.
CPC ................ *B60D 1/26* (2013.01); *B60D 1/62* (2013.01); *B60D 1/64* (2013.01); *B60L 53/36* (2019.02); *B60L 58/12* (2019.02); *B60R 1/003* (2013.01); *B60R 25/04* (2013.01); *B60R 25/102* (2013.01); *B60R 25/23* (2013.01); *B60R 25/25* (2013.01); *B62D 13/06* (2013.01); *B62D 15/0285* (2013.01); *B62D 33/0222* (2013.01); *B62D 53/0821* (2013.01); *B62D 53/12* (2013.01); *B65G 69/005* (2013.01); *E05B 81/54* (2013.01); *E05C 17/02* (2013.01); *G05D 1/0088* (2013.01); *G05D 1/0225* (2013.01); *G05D 1/0231* (2013.01); *G05D 1/0276* (2013.01); *B60L 2200/36* (2013.01); *B62D 63/08* (2013.01); *E05Y 2900/516* (2013.01); *E05Y 2900/531* (2013.01)

(58) Field of Classification Search
CPC .. B60D 1/62; B60D 1/64; B60R 1/003; B60R 25/04; B60R 25/102; B60R 25/23; B60R 25/25; B62D 13/06; B62D 15/0285; B62D 33/0222

See application file for complete search history.

(56) References Cited

U.S. PATENT DOCUMENTS

| | | | | |
|---|---|---|---|---|
| 4,448,447 | A | 5/1984 | Funk | |
| 4,548,783 | A | 10/1985 | Dalke | |
| 4,668,008 | A * | 5/1987 | Stinson | B60J 5/062 |
| | | | | 105/378 |
| 5,026,082 | A * | 6/1991 | Sipp | B60R 3/007 |
| | | | | 403/379.5 |
| 5,137,297 | A * | 8/1992 | Walker | B60S 9/10 |
| | | | | 280/475 |
| 5,305,427 | A | 4/1994 | Nagata | |
| 5,607,221 | A | 3/1997 | Justus | |
| 6,179,319 | B1 | 1/2001 | Malisch | |
| 6,863,538 | B2 | 3/2005 | Mattern | |
| 7,073,816 | B1 * | 7/2006 | Larson | B62D 63/062 |
| | | | | 280/789 |
| 7,243,979 | B1 * | 7/2007 | Stene | B60P 1/027 |
| | | | | 296/181.3 |
| 7,328,442 | B2 * | 2/2008 | Porter | G11B 15/6835 |
| | | | | 360/92.1 |
| 7,562,918 | B2 | 7/2009 | Toma | |
| 7,669,875 | B2 | 3/2010 | Halverson | |
| 7,748,549 | B1 | 7/2010 | Browning | |
| 8,187,020 | B2 | 5/2012 | Algueera Gallego | |
| 8,301,318 | B2 | 10/2012 | Lacaze | |
| 8,532,862 | B2 | 9/2013 | Neff | |
| 8,727,084 | B1 | 5/2014 | Kuker | |
| 8,806,689 | B2 | 8/2014 | Riviere | |
| 8,888,121 | B2 | 11/2014 | Trevino | |
| 9,068,668 | B2 | 6/2015 | Grover | |
| 9,211,829 | B2 * | 12/2015 | Kibler | B60P 1/26 |
| 9,211,889 | B1 | 12/2015 | Hoetzer | |
| 9,302,678 | B2 | 4/2016 | Murphy | |
| 9,370,977 | B2 * | 6/2016 | Sallis, Sr. | B62D 6/001 |
| 9,592,964 | B2 | 3/2017 | Göllü | |
| 9,688,489 | B1 | 6/2017 | Zevenbergen | |
| 10,081,504 | B2 | 9/2018 | Walford | |
| 10,399,477 | B2 | 9/2019 | Obermeyer | |
| 10,556,473 | B2 | 2/2020 | Strand | |
| 11,099,560 | B2 | 8/2021 | Smith | |
| 11,429,099 | B2 | 8/2022 | Smith | |
| 11,560,188 | B2 | 1/2023 | Moore | |
| 11,834,111 | B2 | 12/2023 | Moore | |
| 2003/0233189 | A1 | 12/2003 | Hsiao | |
| 2004/0146384 | A1 | 7/2004 | Whelan | |
| 2005/0017506 | A1 | 1/2005 | Caldwell | |
| 2005/0103541 | A1 | 5/2005 | Nelson | |
| 2006/0071447 | A1 | 4/2006 | Gehring | |
| 2007/0030349 | A1 | 2/2007 | Riley | |
| 2008/0012695 | A1 | 1/2008 | Herschell | |
| 2008/0223630 | A1 | 9/2008 | Couture | |
| 2008/0236907 | A1 | 10/2008 | Won | |
| 2008/0262654 | A1 | 10/2008 | Omori | |
| 2009/0204260 | A1 | 8/2009 | Bryne | |
| 2009/0317223 | A1 | 12/2009 | Schoenfeld | |
| 2010/0025964 | A1 | 2/2010 | Fisk | |
| 2011/0037241 | A1 | 2/2011 | Temple | |
| 2011/0254504 | A1 | 10/2011 | Haddad | |
| 2012/0248167 | A1 | 10/2012 | Flanagan | |
| 2014/0007386 | A1 | 1/2014 | Liao | |
| 2014/0251556 | A1 | 9/2014 | Orton | |
| 2014/0268095 | A1 | 9/2014 | Petkov | |
| 2015/0251366 | A1 | 9/2015 | Voth | |
| 2015/0258908 | A1 | 9/2015 | Fukui | |
| 2015/0263541 | A1 | 9/2015 | Fukui | |
| 2015/0328655 | A1 | 11/2015 | Reichler | |
| 2015/0352721 | A1 | 12/2015 | Wicks | |
| 2015/0360882 | A1 | 12/2015 | Girtman | |
| 2016/0039456 | A1 | 2/2016 | Lavoie | |
| 2016/0054143 | A1 | 2/2016 | Abuelsaad | |
| 2016/0075526 | A1 | 3/2016 | Avalos | |
| 2016/0260328 | A1 | 9/2016 | Mishra | |

(56)          References Cited

U.S. PATENT DOCUMENTS

| | | |
|---|---|---|
| 2016/0304122 A1 | 10/2016 | Herzog |
| 2016/0318490 A1 | 11/2016 | Ben Shalom |
| 2017/0031356 A1 | 2/2017 | Bell |
| 2017/0050526 A1 | 2/2017 | Sommarström |
| 2017/0146168 A1 | 5/2017 | Caprio |
| 2017/0165839 A1 | 6/2017 | Tan |
| 2017/0174019 A1 | 6/2017 | Lurie |
| 2017/0185082 A1 | 6/2017 | Matos |
| 2017/0186124 A1 | 6/2017 | Jones |
| 2017/0305694 A1 | 10/2017 | Mcmurrough |
| 2017/0361844 A1 | 12/2017 | Kahn |
| 2017/0364070 A1 | 12/2017 | Oba |
| 2017/0369260 A1 | 12/2017 | Hoofard |
| 2018/0050573 A1 | 2/2018 | Strand |
| 2018/0202822 A1 | 7/2018 | Delizio |
| 2018/0250833 A1 | 9/2018 | Boria |
| 2018/0264963 A1 | 9/2018 | Dudar |
| 2018/0265076 A1 | 9/2018 | Hall |
| 2018/0265296 A1 | 9/2018 | Beckman |
| 2018/0281178 A1 | 10/2018 | Jacobsen |
| 2018/0346029 A1 | 12/2018 | Kabos |
| 2018/0362270 A1 | 12/2018 | Clucas |
| 2019/0002216 A1 | 1/2019 | Walford |
| 2019/0064828 A1 | 2/2019 | Meredith |
| 2019/0064835 A1 | 2/2019 | Hoofard |
| 2019/0077600 A1 | 3/2019 | Watts |
| 2019/0095861 A1 | 3/2019 | Baldwin |
| 2019/0129429 A1 | 5/2019 | Juelsgaard |
| 2019/0187716 A1 | 6/2019 | Cantrell |
| 2019/0197786 A1 | 6/2019 | Molyneaux |
| 2019/0235504 A1 | 8/2019 | Carter |
| 2020/0239242 A1 | 7/2020 | Hoofard |
| 2020/0338942 A1 | 10/2020 | Winograd |
| 2020/0387166 A1 | 12/2020 | Lacaze |
| 2020/0387168 A1 | 12/2020 | Lacaze |
| 2021/0053407 A1 | 2/2021 | Smith |
| 2021/0061034 A1 | 3/2021 | Moore |
| 2021/0061304 A1 | 3/2021 | Braunstein |
| 2021/0141384 A1 | 5/2021 | Lacaze |
| 2021/0192784 A1 | 6/2021 | Taylor |
| 2021/0238908 A1 | 8/2021 | Ramage |
| 2021/0316761 A1 | 10/2021 | Torrie |
| 2021/0380182 A1 | 12/2021 | Delizio |
| 2022/0080584 A1 | 3/2022 | Wicks |
| 2022/0371199 A1 | 11/2022 | Schultz |
| 2023/0391243 A1 | 12/2023 | Duong |
| 2024/0043075 A1 | 2/2024 | Johannes |
| 2024/0294044 A1 | 9/2024 | Lacaze |

FOREIGN PATENT DOCUMENTS

| | | |
|---|---|---|
| CN | 107380002 | 11/2017 |
| CN | 110723565 | 1/2020 |
| DE | 102012102648 B4 | 9/2012 |
| DE | 102012023999 A1 | 1/2014 |
| EP | 2886497 B1 | 6/2015 |
| EP | 4501548 | 2/2025 |
| JP | S5885702 A | 5/1983 |
| JP | 3215916 B2 | 10/2001 |
| JP | 2020064588 | 4/2020 |
| WO | 2010118420 A2 | 10/2010 |
| WO | 2013180622 A1 | 12/2013 |
| WO | 2016205559 A1 | 12/2016 |
| WO | 2017100716 A1 | 6/2017 |
| WO | 2018001915 A1 | 1/2018 |
| WO | 2019042958 A1 | 3/2019 |
| WO | 2019046383 A1 | 3/2019 |
| WO | 2019118848 A1 | 6/2019 |

OTHER PUBLICATIONS

Bennett, Sean. Modern Diesel Technology: Brakes, Suspension & Steering. New York, Delmar, 2007. pp. 53-54. ISBN-10: 1-4180-1372-2. (Year: 2007).

Fuchs C et al: "3D pose estimation for articulated vehicles using Kalman-filter based tracking", Pattern Recognition. Image Analysis, Allen Press, Lawrence, KS, US, vol. 26, No. 1, Jul. 23, 2016 (Jul. 23, 2016), pp. 109-113, XP036013102, ISSN: 1054-6618, DOI: 10.1134/S1054661816010077 [retrieved on Jul. 23, 2016].

Tofael Ahamed: "Navigation of an Autonomous Tractor Using Multiple Sensors", Thesis, Feb. 22, 2008 (Feb. 22, 2008), XP055527539, Retrieved from the Internet: URL:https://tsukuba.repo.nii.ac.jp/?action =repository action common download&item id=20956 &item- -no=1&attribute- id=17&file- no=2 [retrieved on Nov. 27, 2018] 183 pages, Chapter 9.

* cited by examiner

1630

1670
1672
1652
1680

1690

1630

1632

1614

1612

1690

1680  1610

1600

1630

1680

1690

1630

1632

1690 1652

1680

1610

2953

2950

2954

2952

SYSTEM AND METHOD FOR AUTOMATED OPENING OF TRAILER DOORS

RELATED APPLICATIONS

This application is a continuation-in-part of co-pending U.S. patent application Ser. No. 18/378,119, entitled SYSTEMS AND METHODS FOR AUTOMATED OPERATION AND HANDLING OF AUTONOMOUS TRUCKS AND TRAILERS HAULED THEREBY, filed Oct. 9, 2023, which is a continuation of a continuation of co-pending U.S. patent application Ser. No. 17/897,327, entitled SYSTEMS AND METHODS FOR AUTOMATED OPERATION AND HANDLING OF AUTONOMOUS TRUCKS AND TRAILERS HAULED THEREBY, filed Aug. 29, 2022, now U.S. Pat. No. 11,782,436, issued Oct. 10, 2023, which is a continuation of co-pending U.S. patent application Ser. No. 16/282,258, filed Feb. 21, 2019, entitled SYSTEMS AND METHODS FOR AUTOMATED OPERATION AND HANDLING OF AUTONOMOUS TRUCKS AND TRAILERS HAULED THEREBY, now U.S. Pat. No. 11,429,099, issued Aug. 30, 2022, which claims the benefit of U.S. Provisional Application Ser. No. 62/633,185, entitled SYSTEMS AND METHODS FOR AUTOMATED OPERATION AND HANDLING OF AUTONOMOUS TRUCKS AND TRAILERS HAULED THEREBY, filed Feb. 21, 2018, U.S. Provisional Application Ser. No. 62/681,044, entitled SYSTEMS AND METHODS FOR AUTOMATED OPERATION AND HANDLING OF AUTONOMOUS TRUCKS AND TRAILERS HAULED THEREBY, filed Jun. 5, 2018, and U.S. Provisional Application Ser. No. 62/715,757, entitled SYSTEMS AND METHODS FOR AUTOMATED OPERATION AND HANDLING OF AUTONOMOUS TRUCKS AND TRAILERS HAULED THEREBY, filed Aug. 7, 2018, the entire disclosure of each of which applications is herein incorporated by reference.

FIELD OF THE INVENTION

This invention is related to automated systems and methods for automated operation of trucks, trailers and facilities for handling the same, and more particularly to handling of trailer doors in conjunction with a shipping facility, a production facility or yard.

BACKGROUND OF THE INVENTION

Trucks are an essential part of modern commerce. These trucks transport materials and finished goods across the continent within their large interior spaces. Such goods are loaded and unloaded at various facilities that can include manufacturers, ports, distributors, retailers, and end users. Large over-the road (OTR) trucks typically consist of a tractor or cab unit and a separate detachable trailer that is interconnected removably to the cab via a hitching system that consists of a so-called fifth wheel and a kingpin. More particularly, the trailer contains a kingpin along its bottom front and the cab contains a fifth wheel, consisting of a pad and a receiving slot for the kingpin. When connected, the kingpin rides in the slot of the fifth wheel in a manner that allows axial pivoting of the trailer with respect to the cab as it traverses curves on the road. The cab provides power (through (e.g.) a generator, pneumatic pressure source, etc.) used to operate both itself and the attached trailer. Thus, a plurality of removable connections are made between the cab and trailer to deliver both electric power and pneumatic pressure. The pressure is used to operate emergency and service brakes, typically in conjunction with the cab's own (respective) brake system. The electrical power is used to power (e.g.) interior lighting, exterior signal and running lights, lift gate motors, landing gear motors (if fitted), etc.

Throughout the era of modern transport trucking, the connection of such electrical and pneumatic lines has typically been performed manually by a driver. For example, when connecting to a trailer with the cab, after having backed into the trailer so as to couple the truck's fifth wheel to the trailer's kingpin, these operations all require a driver to then exit his or her cab. More particularly, a driver must crank the landing gear to drop the kingpin into full engagement with the fifth wheel, climb onto the back of the cab chassis to manually grasp a set of extendable hoses and cables (carrying air and electric power) from the rear of the cab, and affix them to a corresponding set onto related connections at the front of the trailer body. This process is reversed when uncoupling the trailer from the cab. That is, the operator must climb up and disconnect the hoses/cables, placing them in a proper location, and then crank down the landing gear to raise the kingpin out of engagement with the fifth wheel.

A wide range of solutions have been proposed over the years to automate one or more of the above processes, thereby reducing the labor needed by the driver. However, no matter how effective such solutions have appeared in theory, the trucking industry still relies upon the above-described manual approach(es) to connecting and disconnecting a trailer to/from a truck tractor/cab.

In the particular case of opening of swinging trailer doors, for a manually driven truck, the doors must typically be opened before backing into the loading dock as the dock opening often cannot accommodate a swinging action without modification. See commonly assigned U.S. Pat. No. 11,325,795, entitled SYSTEMS AND METHODS FOR MODIFYING LOADING DOCK ENVIRONMENTS TO ENABLE TRAILER SWING DOORS TO OPEN INSIDE OF A LOADING DOCK, issued May 10, 2022. More particularly, manual swing door-opening on a trailer is a repetitive and dull/dirty/dangerous task performed billions of times annually, in which drivers are required to vacate the truck cab in a potentially hazardous environment, often blocking traffic. Millions of hours of driver time annually is spent simply opening and closing trailer swing doors in the U.S. alone.

In an automated vehicle (AV) truck environment, where a yard truck may lack a driver, the ability to automatically open the trailer swing doors may comprise a significant operational feature/advantage in reducing the need for human intervention and enhance the overall safety of the facility/yard.

Commonly-assigned U.S. Pat. No. 11,429,099, entitled SYSTEMS AND METHODS FOR AUTOMATED OPERATION AND HANDLING OF AUTONOMOUS TRUCKS AND TRAILERS HAULED THEREBY, issued Aug. 30, 2022, teaches novel systems and methods for automating various operations of trucks, trailers and freight-handling facilities, including systems and methods for opening and retaining trailer swing doors among other systems. This application, and others claiming priority thereto is/are incorporated herein by reference as useful background information.

SUMMARY OF THE INVENTION

This invention overcomes disadvantages of the prior art by providing a station for opening trailer swing doors that uses a mobile platform (termed herein a "sled") with a manipulator arm and associated end effector/tool to perform the unlocking of the trailer lock rod, swinging open of the door, holding the door in the opened position and applying a resilient/flexible/springy retention clip thereto. The sled moves into and out of a confronting position relative to the trailer rear/doors to allow that trailer to drive into or out of the station at the beginning or end of the task. Closing of doors can also be performed at the station in the reverse order of steps. Notably, the system and method can provide a force sensor combined with the manipulator that ensure that, prior to opening the doors, if there is force applied to the doors, then the system will close the door and call for assistance via the web interface (as cargo may be not properly secured inside the trailer, and in such cases the door cannot be opened autonomously. The autonomous door opening/closing/inspection system herein is also adapted to capture images of the trailer interior upon opening the doors or (prior to) closing the doors that are provided to an interface and associated database. These system can employ machine (deep) learning to determine if there are any irregularities versus trained cargo arrangements, and this can enable users to know if a trailer contained or didn't contain freight, or if any freight was improperly restrained, stacked, packed, etc.

In an illustrative embodiment, a system and method for opening a trailer swing door is provided. A station is constructed and arranged to allow the trailer to present a trailer rear to the station, and a sled that moves transverse to a direction of trailer movement into and out of a confronting position with the rear of the trailer. At least one robotic manipulator, mounted on the sled, is constructed and arranged to unlock the trailer lock rod and lock the trailer lock rod, and swing the trailer door to an opened position. Illustratively, the sled can include a camera assembly to locate features on the trailer door. The camera can be interconnected with a machine vison system that scans an interior of the trailer for cargo integrity. The robotic manipulator can be adapted to receive a plurality of tools on an end effector from storage on the sled. The robotic manipulator can be adapted to apply to, and remove from, the hinge line of the door, a door retention clip. The door retention clip can include two opposing legs and an inside leg is thinner than an outside leg so as to avoid interference with cargo operations when applied to the hinge line. The door retention clip can include (a) an interface for selectively engaging the robot manipulator, and (b) fiducials, located on a base between the opposing legs adapted to assist in identification and orientation of the clip relative to the hinge line. Illustratively, the door retention clip can include tools to assist in unlocking and rotating the trailer lock rod. The tools on the door retention clip can be located on or adjacent to a distal end of one or both of opposing legs, and can include a magnet for engaging a hasp and a hook for engaging a lock rod handle. The door retention clip can be located on a rack of a plurality of door retention clips provided on the sled for pick and place by the robot manipulator. Additionally, the door retention clip can include a visible fiducial that is recognized by a camera assembly on the robotic manipulator. Illustratively, the station can include a track to guide motion of the sled and the sled is powered to move along the track. A moving post can be located on each of opposing sides of the trailer, and the posts can be arranged to move into and out of engagement with the trailer door in the open position so as to attach a door retention clip thereto. The robotic manipulator can be constructed and arranged to move each of the posts. Illustratively, the robotic manipulator can be a multi-axis robotic arm. A sensor assembly can determine a location of the trailer with respect to the station and signals at least one of (a) a driver of a manual truck and (b) an AV truck to stop. The sled can further include a plurality of robotic manipulators, each constructed and arranged to perform a same task, or to perform discrete tasks.

In an illustrative embodiment, a method for opening a trailer swing door recognizes and receives, at a station, the trailer as it passes into (e.g. drives-through, backs-into, etc.), the station, moves a sled transverse to a direction of trailer movement into and out of a confronting position with the rear of the trailer, and operates at least one robotic manipulator, mounted on the sled, to unlock the trailer lock rod, and swing the trailer door to an opened position. Illustratively, at least one robotic manipulator, mounted on the sled, can be operated to swing the trailer door to a closed position and lock the trailer lock rod. The robotic manipulator can be adapted to apply to, and remove from, the hinge line of the door, a door retention clip with various features as described above. Using a sensor assembly, a location of the trailer with respect to the station can be determined, and at least one of (a) a driver of a manual truck and (b) an AV truck to stop can be signaled.

In an illustrative embodiment, a removable door retention clip includes a base having a receptacle for engaging a manipulator and at least one fiducial that allows a machine vision system to orient and recognize the clip, and a pair of legs arranged to engage each of opposing sides of a folded trailer door and trailer body, respectively. The legs are adapted to attach to the sides via the manipulator or a manual action.

In an illustrative embodiment an inspection system for a trailer interior includes a camera assembly that acquires images of an interior of the trailer via opened doors of the trailer. The images are acquired either in response to an automated signal to open the doors, or prior to closing the doors. An interface transmits the images in association with identifying information about the trailer to an interface device in response to the automated signal. Illustratively, the camera assembly can transmit images to a deep-learning process trained to recognize proper cargo arrangements and identifies a state of the cargo in the imaged trailer interior. The camera assembly can be associated with a door opening and closing mechanism having a manipulator assembly that unlocks or locks each trailer door and swings it to an open or closed position, respectively.

BRIEF DESCRIPTION OF THE DRAWINGS

The invention description below refers to the accompanying drawings, of which.

DETAILED DESCRIPTION

I. Overview and AV Yard Truck Environment

Figure 1:
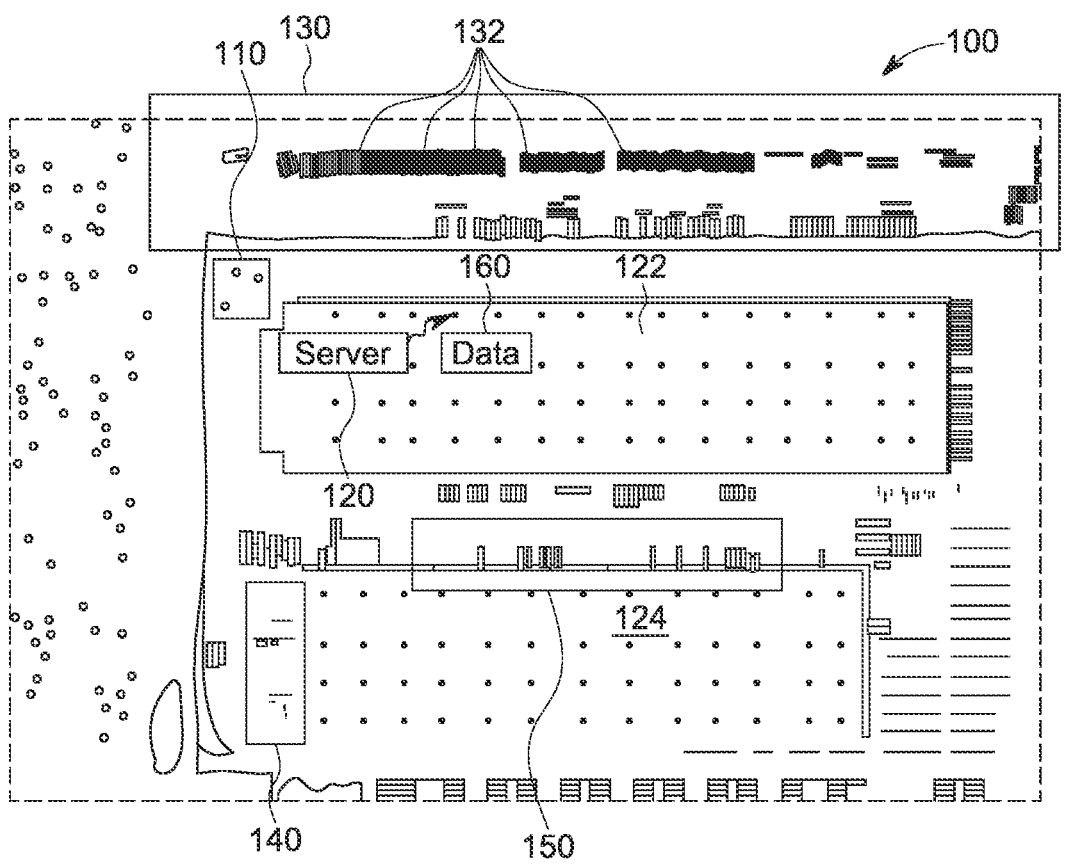
FIG. 1 is a diagram showing an aerial view of an exemplary shipping facility with locations for storing, loading and unloading trailers used in conjunction with the AV yard truck arrangements provided according to a system and method for handling trailers within a yard.

FIG. 1 shows an aerial view of an exemplary shipping facility 100, in which over-the-road (OTR) trucks (tractor trailers) deliver goods-laden trailers from remote locations and retrieve trailers for return to such locations (or else-where-such as a storage depot). In a standard operational procedure, the OTR transporter arrives with a trailer at a destination's guard shack (or similar facility entrance checkpoint) 110. The guard/attendant enters the trailer information in a manual facility arrangement, or in now prevalent electronically controlled/managed facilities/yards with automated check-in processes, drivers check in and receive parking instructions electronically at a kiosk or over a phone/tablet interface. The data entered/racked by the facility can include trailer number or QR (ID) code scan-imbedded information already in the system, which would typically include: trailer make/model/year/service connection location, etc. This is entered into the facility software system (yard managements system/YMS), which is part of a server or other computing system 120, located offsite, or fully or partially within the facility building complex 122 and 124. The complex 122, 124 includes perimeter loading docks (located on one or more sides of the building), associated (typically elevated) cargo portals and doors, and floor storage, all arranged in a manner familiar to those of skill in shipping, logistics, and the like.

By way of a simplified operational example, after arrival of the OTR truck, the guard/attendant (or another electronically based notification) can then direct the driver to deliver the trailer to a specific numbered parking space in a designated staging area 130—shown herein as containing a large array of parked, side-by-side trailers 132, arranged as appropriate for the facility's overall layout. The trailer's data and parked status is generally updated in the company's integrated yard management system (also denoted "YMS"), which can reside on the server 120 or elsewhere.

Once the driver has dropped the trailer in the designated parking space of the staging area 130, he/she disconnects the service lines and ensures that connectors are in an accessible position (i.e. if adjustable/sealable). If the trailer is equipped with swing doors, this can also provide an opportunity for the driver to unlatch and clip trailer doors in the open position, if directed by yard personnel to do so.

At some later time, the (i.e. loaded) trailer in the staging area 130 is hitched to a yard truck/tractor, which, in the present application is arranged as an autonomous vehicle (AV). Thus, when the trailer is designated to be unloaded, the AV yard truck is dispatched to its assigned parking space in order to retrieve the trailer. Note that it is contemplated that the trailer control and inventory systems provided herein generally allow for tracking and organizing of trailer inventory relative to trailer locations in designated parking spots. However, additional functions in the system herein, based in part upon deep-learning and similar AI computing environments/platforms, can allow trailers to be located and connected with AV and manual trucks without regard to designated parking spots. As the yard truck backs down to the trailer, it uses one or multiple mounted (e.g. a standard or custom, 2D grayscale or color-pixel, image sensor-based) cameras (and/or other associated (typically 3D/range-determining) sensors, such as GPS receiver(s), radar, LiDAR, stereo vision, time-of-flight cameras, ultrasonic/laser range finders, etc.) to assist in: (i) confirming the identity of the trailer through reading the trailer number or scanning a QR, bar, or other type of coded identifier; (ii) Aligning the truck's connectors with the corresponding trailer receptacles. Such connectors include, but are not limited to, the cab fifth ($5^{th}$) wheel-to-trailer kingpin, pneumatic lines, and electrical leads. Optionally, during the pull-up and initial alignment period of the AV yard truck to the trailer, the cameras mounted on the yard truck can also be used to perform a trailer inspection, such as checking for damage (including confirming the condition of the trailer roof based on sensors mounted on the yard truck which can scan the roof of the trailer) and confirming tire inflation levels, and verifying other safety criteria.

The hitched trailer is hauled by the AV yard truck to an unloading area 140 of the facility 100. It is backed into a loading bay in this area, and the opened (described in detail below) rear is brought into close proximity with the portal and cargo doors of the facility. Manual and automated techniques are then employed to offload the cargo from the trailer for placement within the facility 100. During unloading, the AV yard truck can remain hitched to the trailer or can be unhitched so the yard truck is available to perform other tasks. After unloading, the AV yard truck eventually removes the trailer from the unloading area 140 and either returns it to the staging area 130 or delivers it to a loading area 150 in the facility 100. The trailer, with rear swing (or other type of door(s)) open, is backed into a loading bay and loaded with goods from the facility 100 using manual and/or automated techniques. The AV yard truck can again hitch to, and haul, the loaded trailer back to the staging area 130 from the loading area 150 for eventual pickup by an OTR truck. Appropriate data tracking and management is undertaken at each step in the process using sensors (described below) on the AV yard truck and/or other manual or automated data collection devices—for example, terrestrial and/or aerial camera drones.

Figure 2:
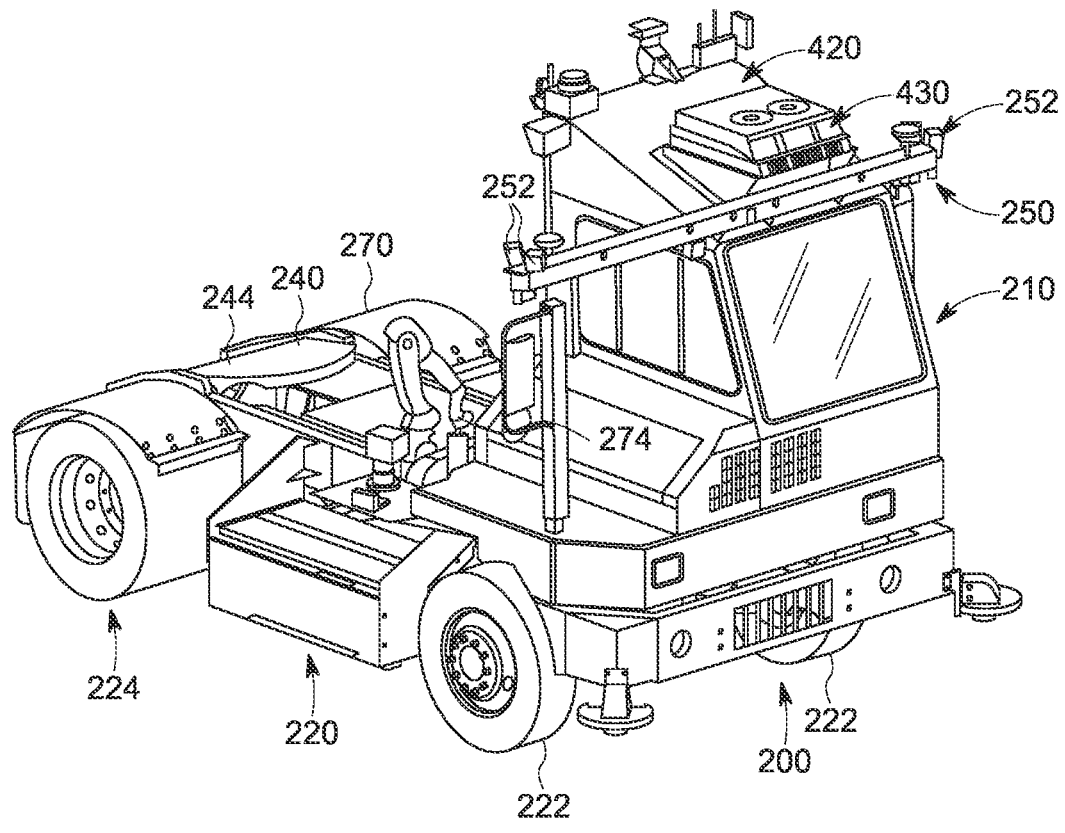
FIG. 2 is a front-oriented perspective view of an exemplary AV yard truck for use in association with the system and method herein.
Figure 3:
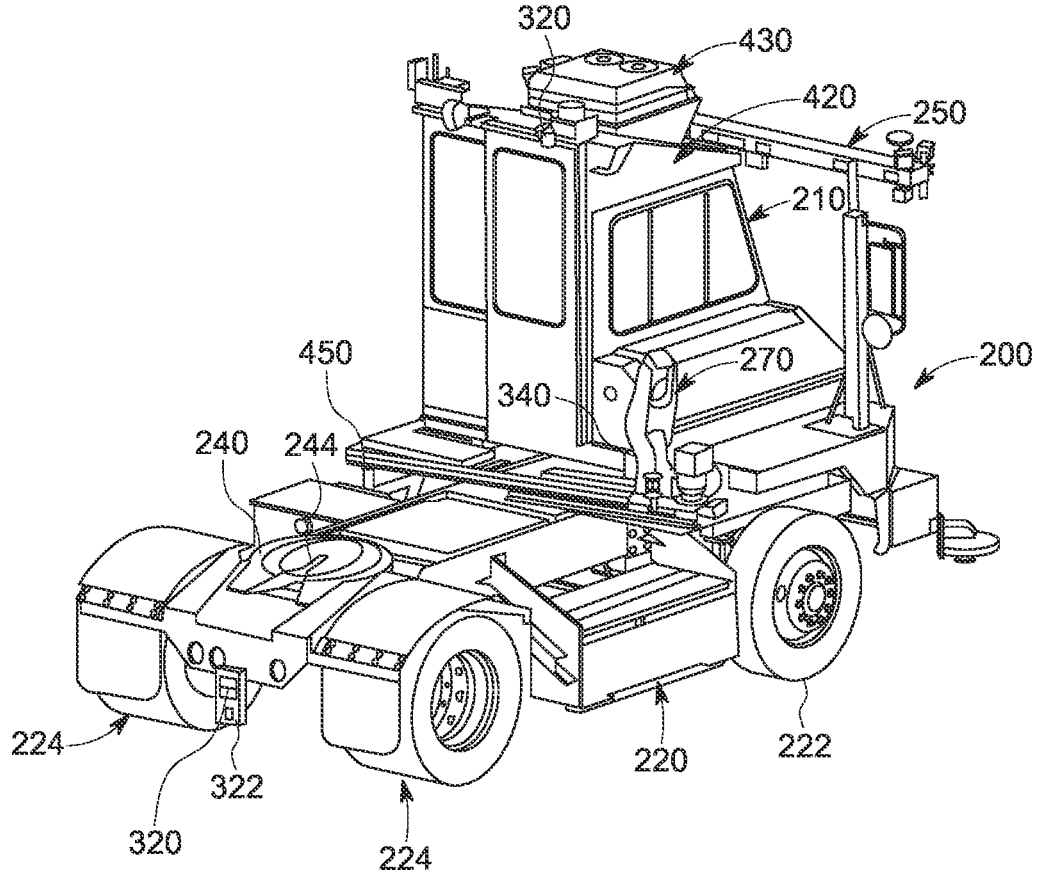
FIG. 3 is a rear-oriented perspective view of the AV yard truck of FIG. 2.
Figure 4:
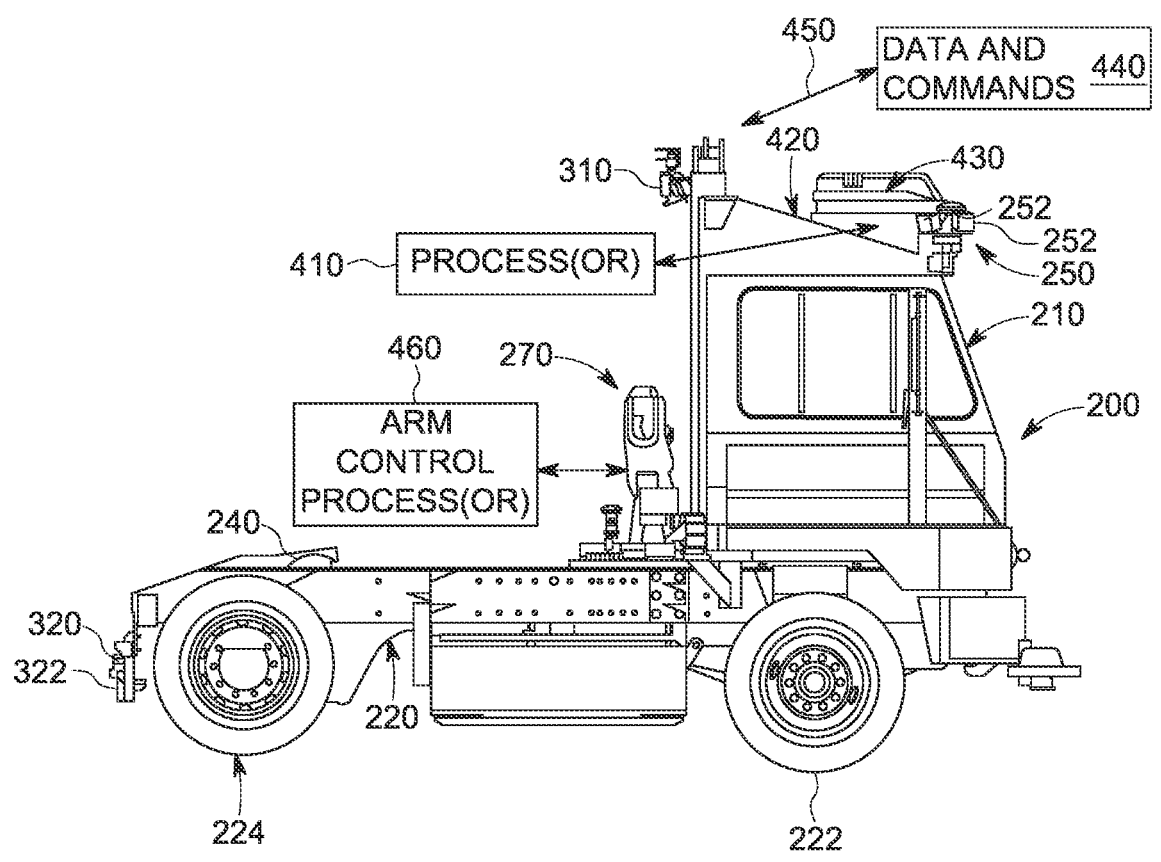
FIG. 4 is a side view of the AV yard truck of FIG. 2.

Having described a generalized technique for handling trailers within a facility reference is now made to FIGS. 2-4, which show an exemplary AV yard truck 200 for use herein. The yard truck 200 is powered by diesel or another internal combustion fuel, including hydrogen, and/or by electricity, using appropriate rechargeable battery assembly that can operate in a manner known to those of skill. For the purposes of this description, the AV yard truck is powered by rechargeable batteries, but it is contemplated that any other motive power source (or a combination thereof) can be used to provide mobility to the unit. Notably, the yard truck 200 includes at least a driver's cab section 210 (which can be omitted in a fully autonomous version along with other manual controls) and a chassis 220 containing front steerable wheels 222, and at least one pair of rear, driven wheels 224 (shown herein as a double-wheel arrangement for greater load-bearing capacity). The respective chassis 220 also includes a so-called fifth ($5^{th}$) wheel 240 that is arranged as a horseshoe-shaped pad with a rear-facing slot 244, which is sized and arranged to receive the kingpin hitch located at the bottom front of a standard trailer (not shown). The fifth wheel 240 shown tilted downwardly in a rearward direction so as to facilitate a ramping action when the AV truck is backed onto the trailer. Various fifth wheel-lifting mechanisms can be provided, which employ appropriate hydraulic lifting actuators/mechanisms known to those of skill so that the hitched trailer is raised at its front end. In this raised orientation, the hitch between the truck and trailer is secured.

The AV yard truck can include a variety of custom or commercially available remote sensors and/or autonomous driving sensing arrangements (e.g., those available from vendors, such as Velodyne Lidar, Inc. of San Jose, CA or Ouster, Inc. of San Francisco, CA), including, but not limited to GPS, LiDAR, radar, image-based (e.g. machine vision), inertial guidance, and ultrasonic that allow it to navigate through the yard and hitch-to/unhitch-from a trailer in an autonomous manner that is substantially or completely free of human intervention. Such lack of human intervention can be with the exception, possibly, of issuing an order to retrieve or unload a trailer—although such can also be provided by the YMS via the server 120 using a wireless data transmission 160 (FIG. 1) to and from the truck (which also includes an appropriate wireless network transceiver—e.g. WiFi-based, etc.). One example of sensor placement is shown and described in U.S. patent application Ser. No. 17/511,087, entitled PROCESSOR AND SENSOR ARRAY FOR AUTONOMOUS TRUCK, filed Oct. 26, 2021, the teachings of which are incorporated by reference as useful background information. The exemplary AV yard truck 200 includes a novel top-mounted bar 250 that carries various sensors (e.g. visual imaging sensors and LiDAR) in a manner that affords a desirable line of sight. For example visual sensors 252 are provided on ends of the bar 250 and a rear visual sensor 310 (FIG. 3) is provided at the top of the cab, and is used as part of the trailer connection system as described below. A rear bumper visual sensor 320 and LiDAR sensor are also depicted to aid in backup and hitching operations. Other sensors as described in the above-incorporated U.S. patent application Ser. No. 17/511,087 are also provided around the truck chassis 220 and cab 210. The processing components 410 (also termed "processor") for various sensing telemetry can be housed in the cab roof cap 420, which is wedge-shaped in this embodiment. It can include a cooling (e.g. fan) unit 430 and appropriate heat sinks to remove excess heat generated by data processing, storage and transceiver components. As also shown the processor(s) 410 receive and transmit data and commands 440 via an RF link 450 as described above.

Notably, the AV yard truck 200, includes an emergency brake pneumatic hose (typically red) 340 (shown in phantom in FIG. 3), service brake pneumatic hose (typically blue, not shown) and an electrical line (often black, not shown), that extend from the rear of the cab 210. This allows arrangement for access by yard personnel when connecting and disconnecting the hoses/lines from a trailer during the maneuvers described above.

In operation, control of the truck 200 can be implemented in a self-contained manner, entirely within the processor 410 which receives mission plans and decides on appropriate maneuvers (e.g. start, stop, turn, accelerate, brake, move forward, reverse, etc.). Alternatively, control decisions/functions can be distributed between the processor 410 and a remote-control computer—e.g. the server 120, that computes control operations for the truck and transmits them back as data to be operated upon by the truck's local control system. In general, control of the truck's operation, based on a desired outcome, can be distributed appropriately between the local processor 410 and the facility system server 120.

In the exemplary embodiment, the AV truck chassis 220, rearward of the cab 210, includes an area that resides in front of the fifth wheel 240 that supports a multi-axis robotic manipulator arm assembly 270 that move in three dimensions (e.g., 7 degrees of freedom (DOF)) in a programmed path according to conventional robotic behavior. The arm assembly 270 is mounted on a track 450 that enables powered, lateral motion across the width of the chassis 220. The arm assembly 270 can be based upon a conventional robot, such as the GP7, available from Yaskawa America, Inc. of Waukegan, Il. The end of the arm assembly can include a customized end effector assembly with an associated tool-changing mechanism that is arranged to selectively pick up gladhand engaging tools on the trailer front, and attach a corresponding gladhand (i.e. and adapterless implementation), or structure with a native gladhand-engaging adapter on the end of the hose 340, so as to complete an emergency brake pneumatic circuit between the AV yard truck 200 and the trailer. Other connections can be made by the robotic arm, e.g. between the service brake lines and/or the electrical connections using appropriate motion control and adapters. More generally, the attachment of AV truck pneumatic lines to various types of native gladhands is shown and described in above-incorporated commonly-assigned, U.S. Pat. No. 11,707,955, issued Jul. 25, 2023, the teachings of which are incorporated herein by reference. It should be clear that the end effector 274 can define a variety of shapes and functions, depending upon the nature of the task and type of adapter used to connect the AV truck pneumatic line to the native gladhand on the trailer front. Likewise, the number of axes and motion capability of the arm 270 is highly variable, depending upon the nature of the task and relative location of the robot versus the trailer gladhand. In general, the robot 270 is positioned on the chassis 220 in such a manner that it can be stowed without (free of) interfering with normal turning of the trailer on its kingpin when hitched to the AV yard truck 200. The tracking 450 can be angled rearwardly from one side to the other (as shown) to help facilitate forward stowage of the robot 270 when not in use (as shown). As described further below, the robot arm 270 moves under the control of a processor arrangement 460 they can be contained within the robot housing or (in whole or in part) provided as part of the overall processing arrangement 410. Note that any of the processing functions herein can be performed in the stand-alone fashion on the AV yard truck 200, or can be partially performed remotely by the server 120 for the yard.

II. Door Opening Mechanisms

A. General Considerations

The following is a description of various embodiments of door opening mechanisms and associated stations that can operate on trailers with swing doors in a cargo facility/yard environment. The principles herein are expressly contemplated to apply to either the above-described AV yard truck implementation or a manually/human-driven OTR or yard truck as appropriate. More generally, if a trailer is either equipped with a rolling door, or its swing doors have already been secured in the open position by OTR driver (see above), or other representative, then the load can be directed to a pre-designated (un)loading dock in a facility/yard. However, if the trailer is equipped with secured swing doors, in the closed position, then it is desirable to provide an automated mechanism to allow for the doors to be opened in an automated manner. The following embodiments describe mechanisms and associated stations that open trailer swing doors, and retain such doors in the opened position. Note that, by way of further background information, and in support of the inventive concepts described herein, the embodiments of FIGS. 5-15 are generally described in the above-incorporated U.S. Pat. No. 11,429,099.

Note that, in certain instances, some facility/yard operations contain a large percentage of trailers (sometimes nearing or equaling 100%) that are a captured fleet, or a fleet of trailers that do not vary in any significant manner across a yard or network of yards. In this instance, some modifications to these trailers can be made (either when originally purchased as part of the trailer specification or as a retrofit to an existing trailer), which can facilitate beneficial, easier, higher performance or faster robotic door opening of the trailer. By way of non-limiting example, these modifications can include QR codes, or other markings, applied to the door handles or latching mechanisms, modified door handles, locking mechanisms and/or modified devices for securing the swing door to the side of the trailer—all of which can enhance the speed and performance of the robotic door opening station according to embodiments herein.

B. Articulating Arms

Figure 5:
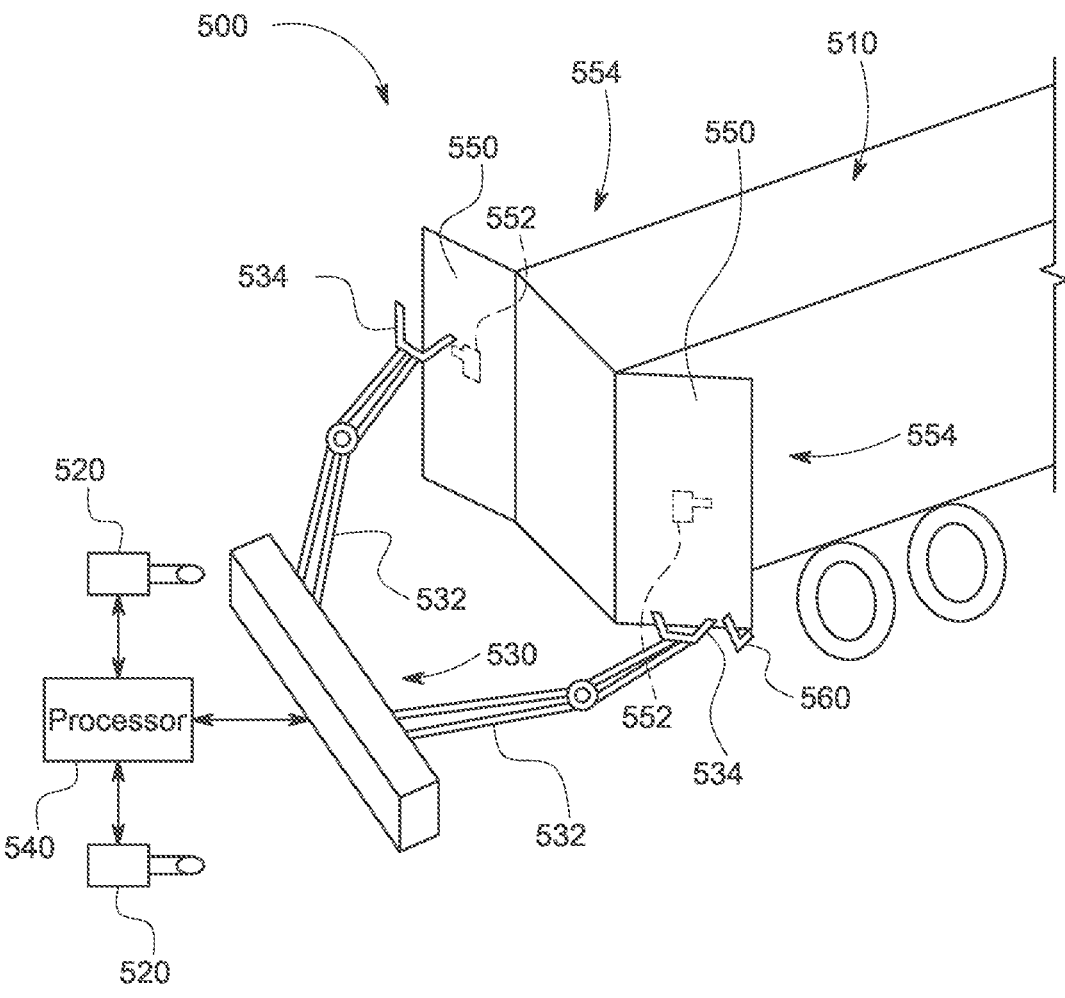
FIG. 5 is a diagram of door station for use in opening/closing trailer doors for use in the loading/unloading process within the yard environment.
Figure 6:
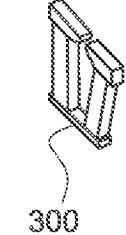
FIG. 6 is a detailed view of the clamping mechanism of FIG. 5, according to an illustrative embodiment.
Figure 7:
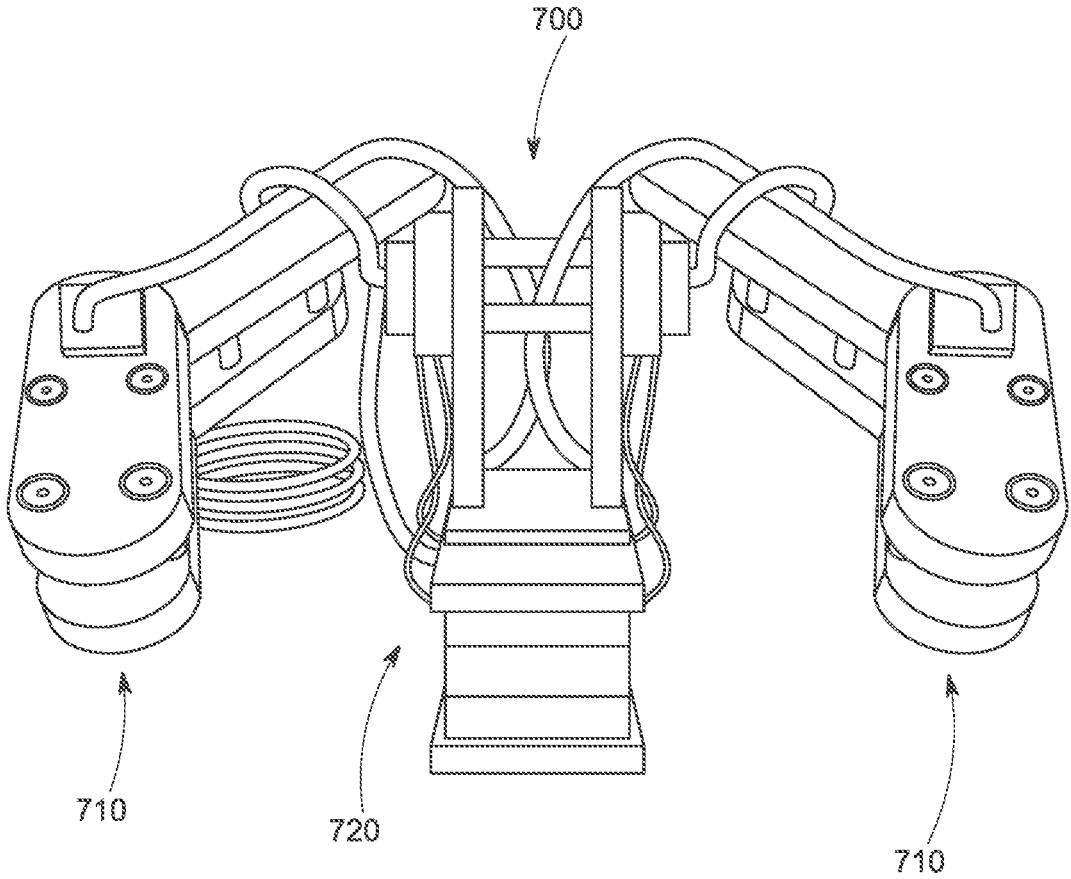
FIG. 7 is a perspective view of an exemplary, multi-arm robot for use in the door station of FIG. 5.

In an embodiment, as shown generally in FIG. 5, the hitched-together truck and trailer 510 can be backed down to either a redesignated empty loading bay, or a stand-alone station (e.g. a wall) 500, that has been modified to include network connected camera(s) 520 and a set of articulating arms 532 that are part of a robotic assembly 530. Through the use of the camera(s) 520, a remote operator and/or processor 540 (that can include vision system and robot-servoing modules) operates the arms 532, and be capable of grasping door latches 552 (shown in phantom), unlocking the doors 550, swinging them approximately 270 degrees, and securing them to the sides 554 of the trailer. Each arm 532 can include an articulated end effector 534 that acts as a grasping device. Illustratively, instead of securing the conventional hooks and eyebolts found on most trailer door arrangements, securing doors 550 to the side 554 of the trailer 510 can be accomplished by the robotic arm delivering a stand-alone clamping mechanism 560, which can be deployed to temporarily secure the door to the bottom of the trailer body as shown. A more detailed view of an exemplary clamping mechanism is shown in FIG. 6. The clamps can be constructed from a flexible polymer and/or a metal having discrete or integral spring members that allow for a removable pinch action. As such, the clamps can frictionally bias the lower edges of the doors against each side, free of slippage, but such friction can be overcome by grasping and removing the clamp. In general the robot and arms should allow clearance for the doors between an opened and closed condition (e.g. approximately 3-6 feet).

By way of non-limiting example a multi-arm robot assembly, which can be commercially available, can provide the basis for a manipulator used in handling doors. Such a commercially available robot 700 is shown by non-limiting example in FIG. 7. It consists of two independently moving arm assemblies 710 attached to a central base 720. A variety of alternate arrangements are contemplated, and such arrangements can facilitate motion is various degrees of freedom, as required to carry out latch-unlocking, swinging and securing functions as desired.

In operation, after the doors are swung open at the door station, the open-doored trailer can then be backed by the AV yard truck into an active unloading bay. Likewise, the process can be reversed once the trailer has been reloaded and is ready to depart the yard. That is, the yard truck hitches and/or hauls it away from the loading dock and backs it into the door station. The robot arrangement (530) is used to unclamp the doors, swing them closed and secure the latches.

C. Door Opening Framework

Figure 8:
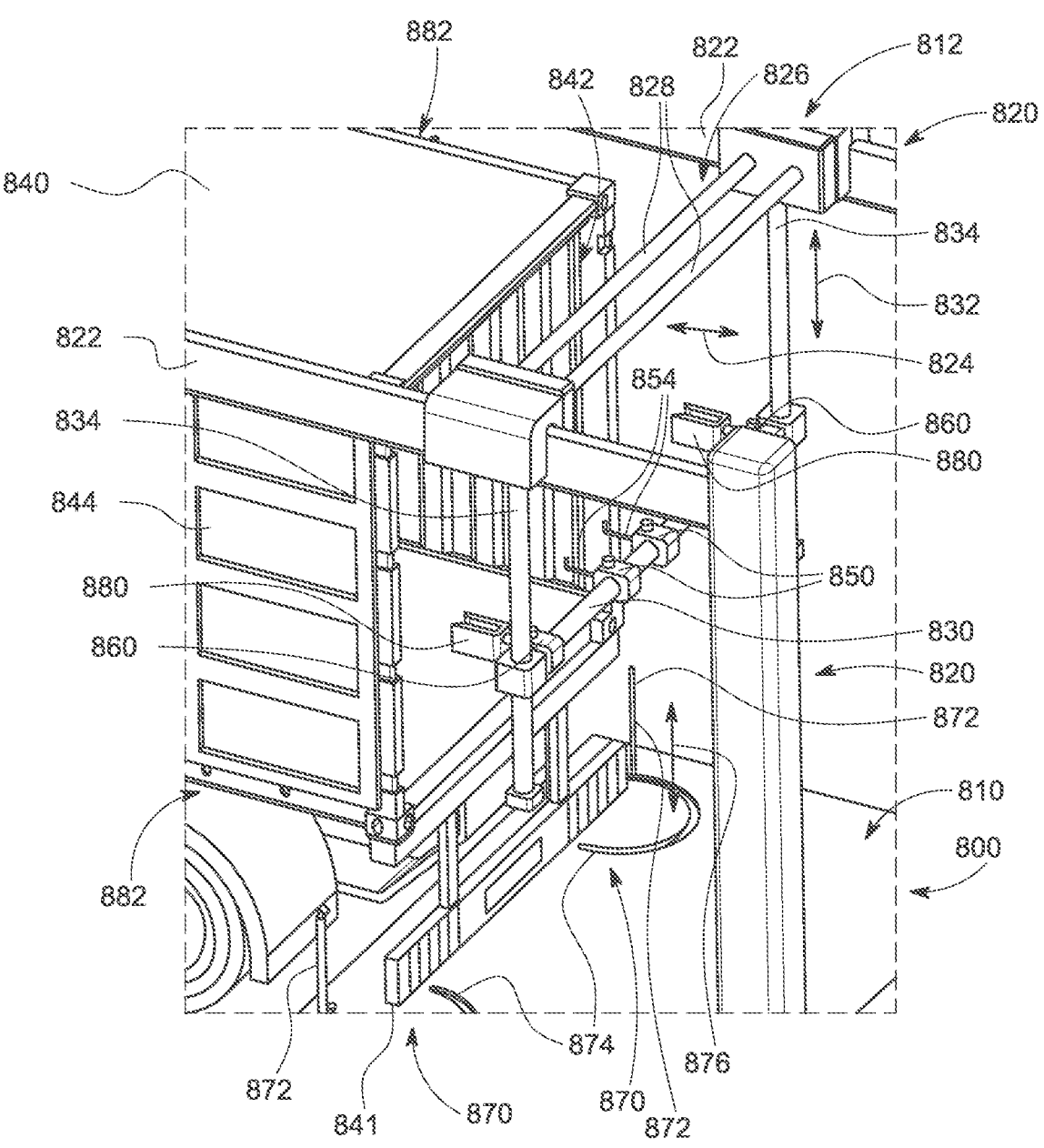
FIG. 8 is fragmentary perspective view of an exemplary trailer rear located adjacent to a door station consisting of floor base having retractable door-opening posts and a framework into which the trailer backs, having door unlocking and open-door-fixing mechanisms that selectively engage the trailer swinging rear doors.
Figure 9:
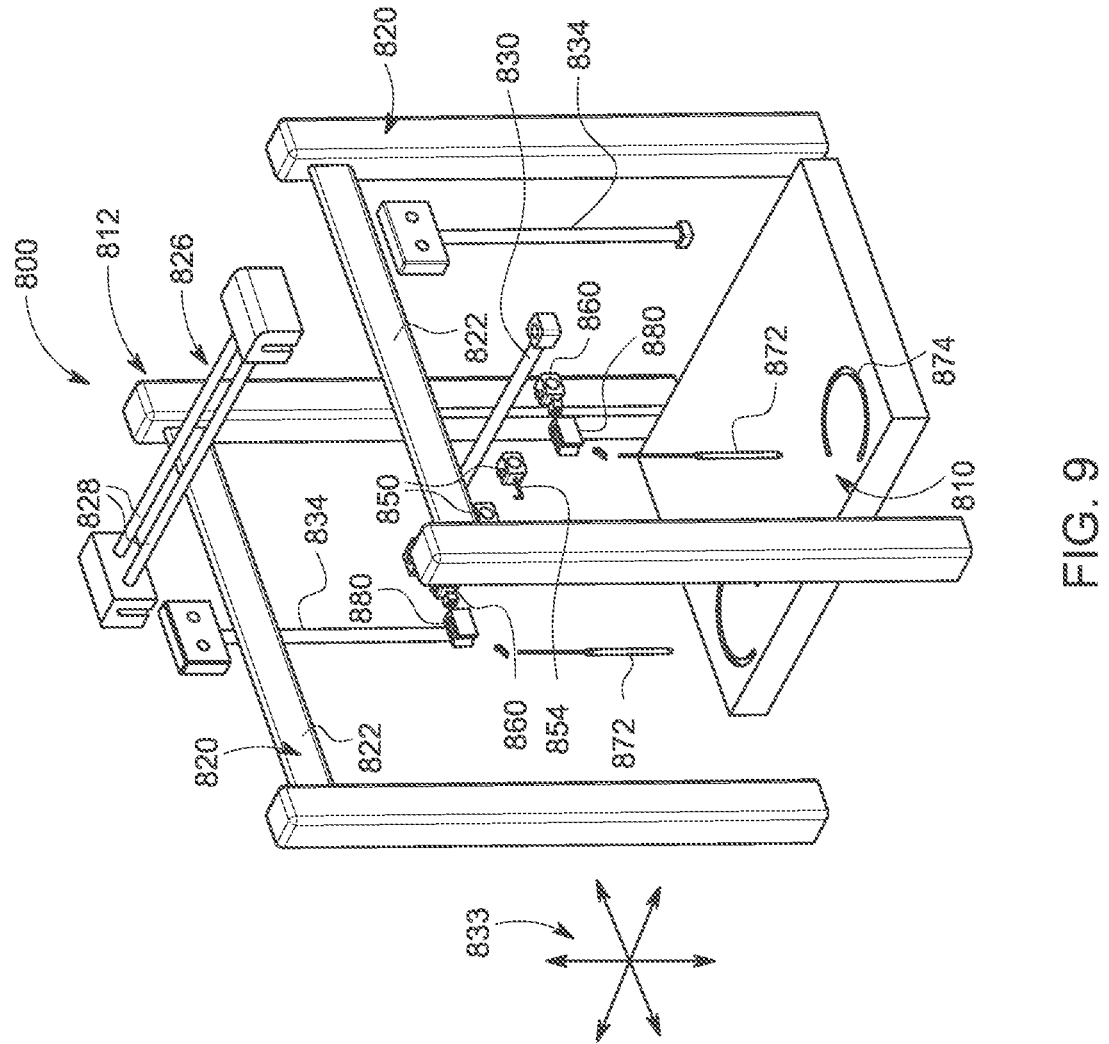
FIG. 9 is an exploded perspective view of the door station of FIG. 8.

In another embodiment, shown in FIG. 8, the door station 800 employs unique mechanisms for each discrete task. Each mechanism (a basic rod, set of rods, or rod(s) with end effectors) is responsible for performing a particular task. The station 800 consists of a floor base 810 and an upright, framework 812 composed of a pair of spaced-apart (U-shaped) gantry frame members 820 (e.g. approximately 8-14 feet apart, 8-14 feet long, 6-14 feet tall). With further reference to FIG. 9, the structure of the framework 812, and overall door station, is also shown in exploded view. The framework 812 supports a vertically moving (double-arrow 832) cross beam or slide 830. The top beam 822 on each frame member 820 defines a slide, upon which moves (in a forward/rearward direction—double-arrow 824) a linear slide. The linear slide 826 include (e.g.) lateral bars 828, which carry spaced-apart, vertical posts 834. These posts 834 are spaced apart at least the width of the trailer 840. The posts carry, and allow vertical movement (double arrow 832) of a lateral cross beam or slide 830. Note that linear motion (vertically and horizontally, and up/down, front/rear, left/right—see orthogonal x,y,z axes 833) of the various sliding components herein can be effectuated by a variety of mechanism, which should be clear to those of skill, including rack and pinion systems, driven lead screws, linear motors, pneumatic/hydraulic (fluid) pistons.

The cross beam/slide 830 includes several mechanisms that can (optionally) move horizontally along the cross beam 830 and extend as needed (under front/rear motion of the linear slide 826) to engage the rear 842 of the trailer 840. Note, briefly, the presence of an underride bar 841, which can be clamped by a dock-lock or other safety mechanism as described further below. These cross-beam-mounted mechanisms include a door unlatching mechanism 850 and an open door locking/fixing mechanism 860 (on each of opposing sides of the cross beam 830). The door unlatching mechanism 3250 employs a pair of forwardly extended, upturned hooks, or other suitable end-effector (e.g. a gripper jaw, electromagnet, etc.), 854 that enter below each latch by coordinated motion of the forward/rearward-moving linear slide 826 and the upward/downward movement of the cross beam 830. Once hooked, each latch is lifted and the hooks 854 are moved rearwardly to rotate the lifted latches and thereby rotate and unlock the (typically conventional trailer door rods).

Once unlatched, the doors are swung open using the opening mechanism 870 residing in the floor base 810. Notably, the door opening mechanism 870 of this embodiment, defines a pair of posts or rods 872 that each uniquely rise (double-arrows 876) out of each of two (left and right) lunate curved slots 874 on the floor base 810, and, once engaged with the interior of each respective (now-unlatched) swing door 844, execute motion in an arc along its path to position each door flush, or close to flush, along the side 882 of the trailer 840. Note that the posts 872, while tracing a semicircular path (defined by slots 874) to swing open the doors can follow a partial-polygonal, elliptical, irregularly curved and/or straight line path to move the doors to the sides of the trailer. Moreover, while extending/retracting posts are shown, another structure, such as a cam wheel with a rising post, or similar arrangement can be used in alternate embodiments. Also, while not shown, the posts 872 can be driven beneath the floor by a rotating drive plate, swinging arm, curved rack and pinion, or a variety of other mechanical systems that should be clear to those of skill.

Once the posts 872 have moved the doors to a swung-open position, along the sides of the trailer as shown in FIG. 8, a separate device 860 mounted on the cross beam 830 at opposing sides thereof, delivers a flexible, rubberized (or the like) horseshoe or clip-shaped clamp 880 over the now-sandwiched door 844 and trailer side 882 to prevent it from swinging closed, and maintain it engaged against the side 882 of the trailer.

Figure 10:
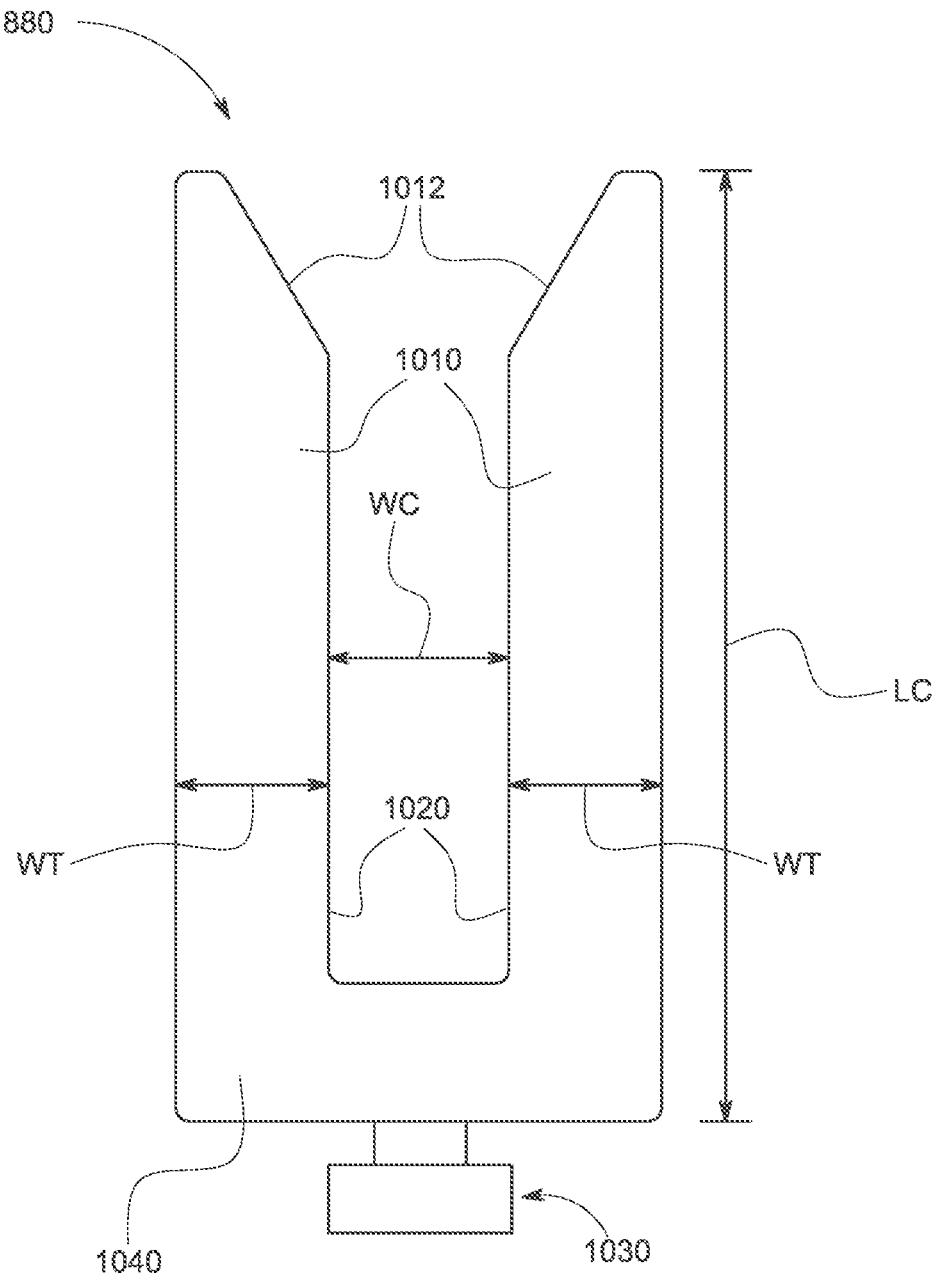
FIG. 10 is a plan view of an exemplary door-fixing clamp that can be applied to a swung-open trailer door to maintain it in such position during transit and unloading for use in the open-door-fixing mechanism of FIG. 8.
Figure 11:
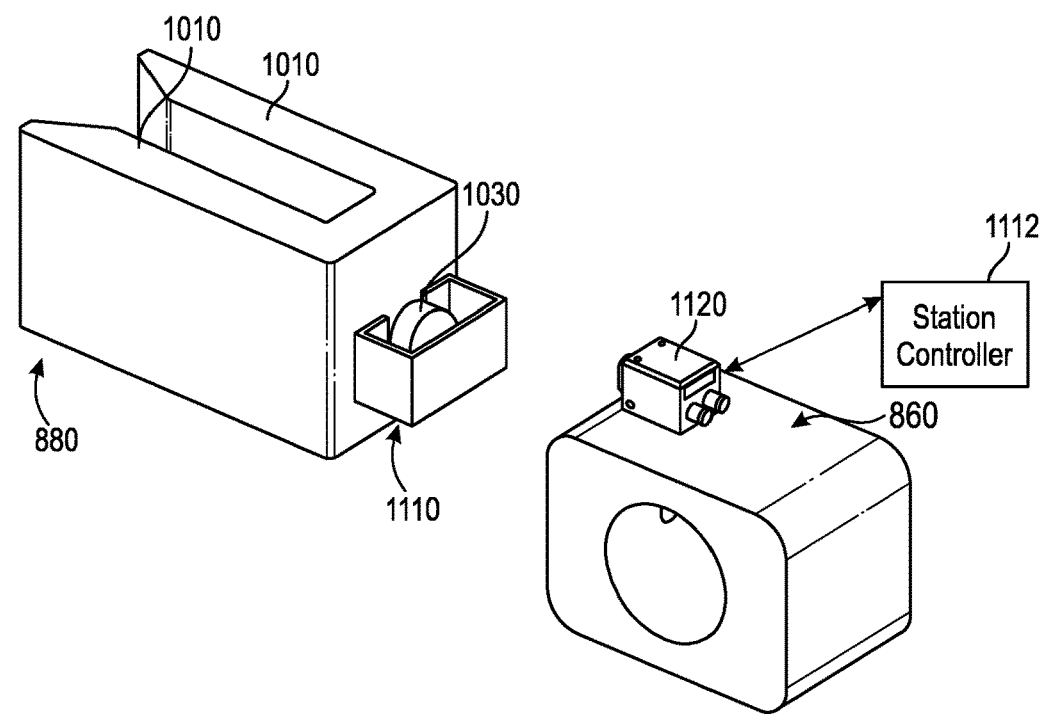
FIG. 11 is a perspective view of the door-fixing clamp and associated gripper mechanism of the open-door-fixing mechanism of FIG. 8, shown gripping the clamp.
Figure 12:
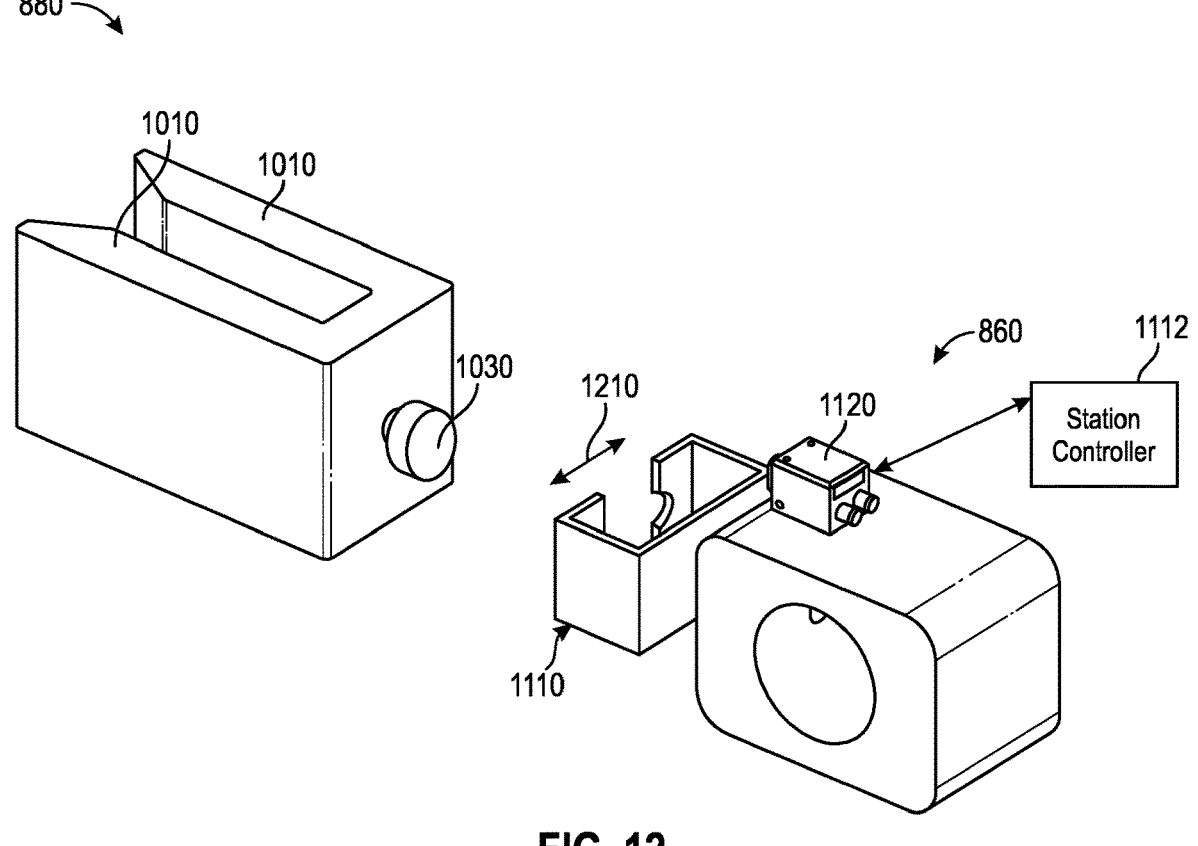
FIG. 12 is a perspective view of the door-fixing clamp and associated gripper mechanism of FIG. 11, shown releasing the clamp.

With particular reference to FIGS. 10-32G, the structure and operation of a trailer swing-door hold-open mechanism according to an embodiment is shown in greater detail. As shown in FIG. 10, the clamp 880 is shown in plan view. The clamp 880 is constructed from a durable, flexible material—e.g. synthetic or natural rubber, nylon, ABS, or a composite (e.g. glass-filled nylon). Alternatively, the clamp can be constructed wholly or partially from metal—with sufficient spring constant or an integrated spring component. The clamp 880 has a length LC—which should be sufficient to allow it to firmly/frictionally engage the swung-back trailer door free of slippage—for example 4-15 inches. The clamp 880 is shaped similar to a clothespin, with a pair of opposing tines 1010, with opposing, tapered free (distal) ends 1012. The ends 1012 assist in guiding the clamp onto the swung-open door. The width WC between the tines 1010 should be chosen based upon the thickness TD (See FIG. 13) of the sandwiched door and side. For example, the width WC is approximately 2-5 inches. The inner surfaces 1020 of the tines 1010 define parallel planes as shown, but one or both can alternatively define a polygonal (non-planar) and/or curved inner surface to facilitate gripping and holding of the swung-back door against the trailer side. The thickness of the clamp (perpendicular to the page can vary (e.g. 1-3 inches), as can the width WT of each tine 1010 (e.g. 1-3 inches). These parameters help to determine the durability and spring constant of the clamp. The proximal, connected end 1040 of the clamp 880 includes a T-shaped stud 1030, that is sized and arranged to be selectively gripped (FIG. 11) and released by a horizontally moving (double-arrow 1210 in FIG. 12) gripper 1110. An electrical connector 1120 that powers an actuator (e.g. a solenoid) can be used to operate the gripper 1110 between the gripped and released states. Appropriate springs and other mechanisms can also be employed on the gripper 1110, in a manner clear to those of skill. The gripper 1110, and other functional elements of the door station, can be interconnected with a local door station controller 1112 that is also linked to the overall autonomy system within the facility (e.g. the server 120).

It should be noted that the door station arrangement described herein effectively addresses the automation of the door-unlatching and opening task, but also more generally reduces or eliminates wasted time, fuel/electricity/energy and safety hazards resulting from the need for a driver to exit the cab of his/her truck every time swing doors are to be opened. Hence, the applicability of the door station arrangement herein extends not only to automated yard operations, but also to conventional, manually attended yards where trailer swing doors require handling.

Illustratively, the door station arrangement can be positioned in one or more designated locations in a trailer yard (e.g. near the guard shack where trailers check in, or in a designated parking spot. The arrangement described above can, more generally, be part of an overhead gantry or a portable system.

A swing door opening system according to the door station arrangement can be operated by an operator onsite, or a remote operator responsible for operating multiple systems across wide-spread geographies. In a training procedure, a vision system associated therewith can use available (or custom) pattern recognition and robot servoing vision tools (using cameras, which can be stationary and/or located on the manipulator/cross beam of the arrangement) to understand how to open the swing door(s) of many configurations. Such doors can represent a wide range of commercially available configurations, including those with 2, 3 or 4 lock rods/latches, handles at different heights and with/without e.g. rear door aerodynamics, such as the TrailerTail®, rear, folding aerodynamic structure, available from Stemco LP of Longview, TX. In an illustrative operating environment, a trained system can potentially employ multiple (e.g. tens, hundreds, thousands), of these door stations, operating automatically at yards across the world. Such systems can include a manual override capability in the event it is desirable or mandatory that a human operator (i.e. a teleoperator, sitting in a remote control location) take over and control the door station manipulators accordingly and/or to notify an onsite person at the specific yard in which the door station resides. It is contemplated that the door station, and any other automated system described herein, can include an emergency stop switch, or other manual control, which is readily accessible and stops operation in the event of an emergency. Additional safety measures, such as animal/human presence detectors-relying on shape, heat signature and/or other biometric data, can be employed to ensure that automated systems do not harm a living entity.

Figure 13:
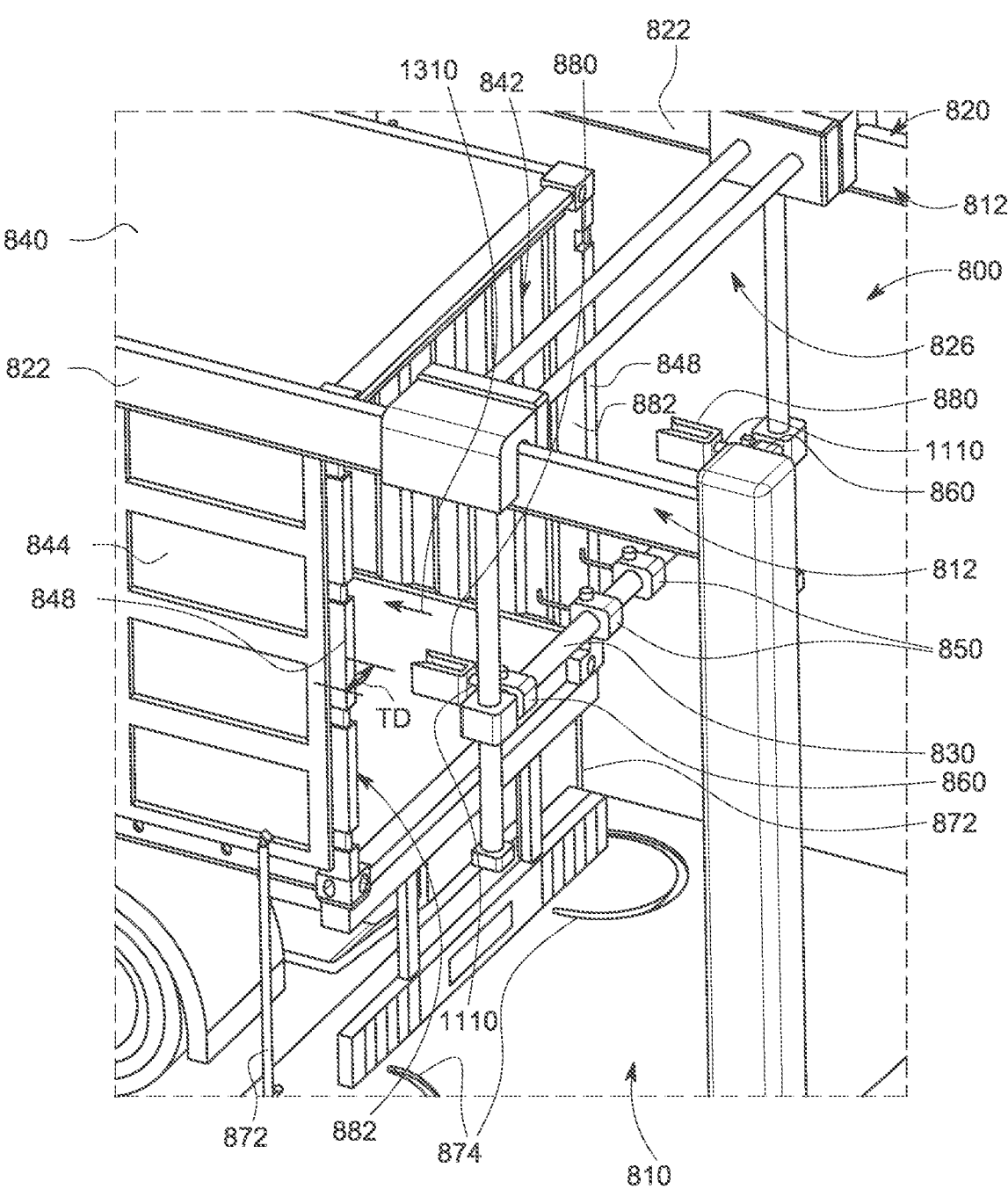
FIG. 13 is a fragmentary perspective view of the exemplary trailer rear and door station of FIG. 8, showing the open-door-fixing mechanism moving to apply clamps to the edges of the swung-open doors, as the door-opening posts are extended from the floor base to maintain the doors in swung-open positions.
Figure 14:
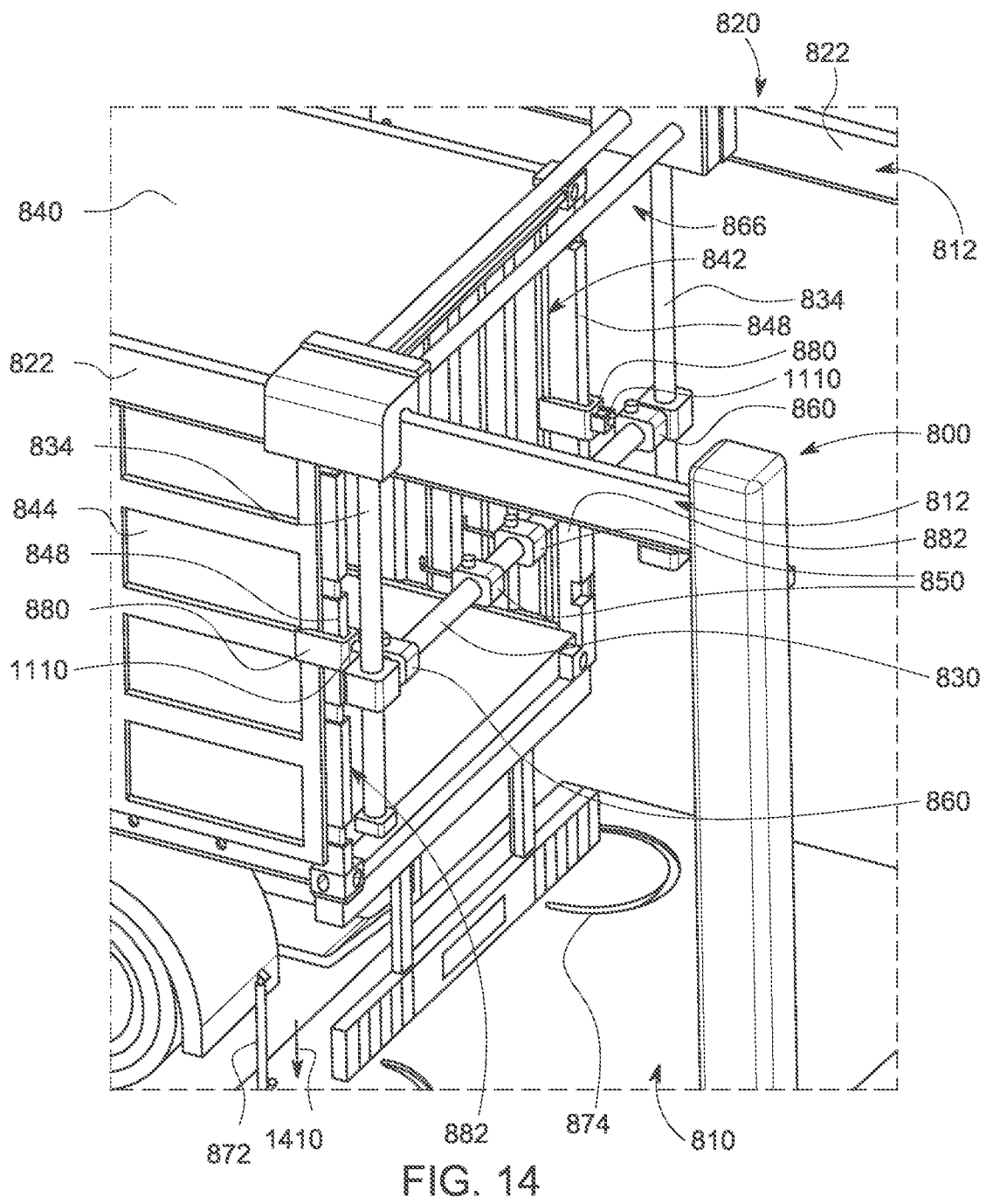
FIG. 14 is a fragmentary perspective view of the exemplary trailer rear and door station of FIG. 8, showing the open-door-fixing mechanism applying clamps to the edges of the swung-open door, as the door-opening posts retract into the floor base.
Figure 15:
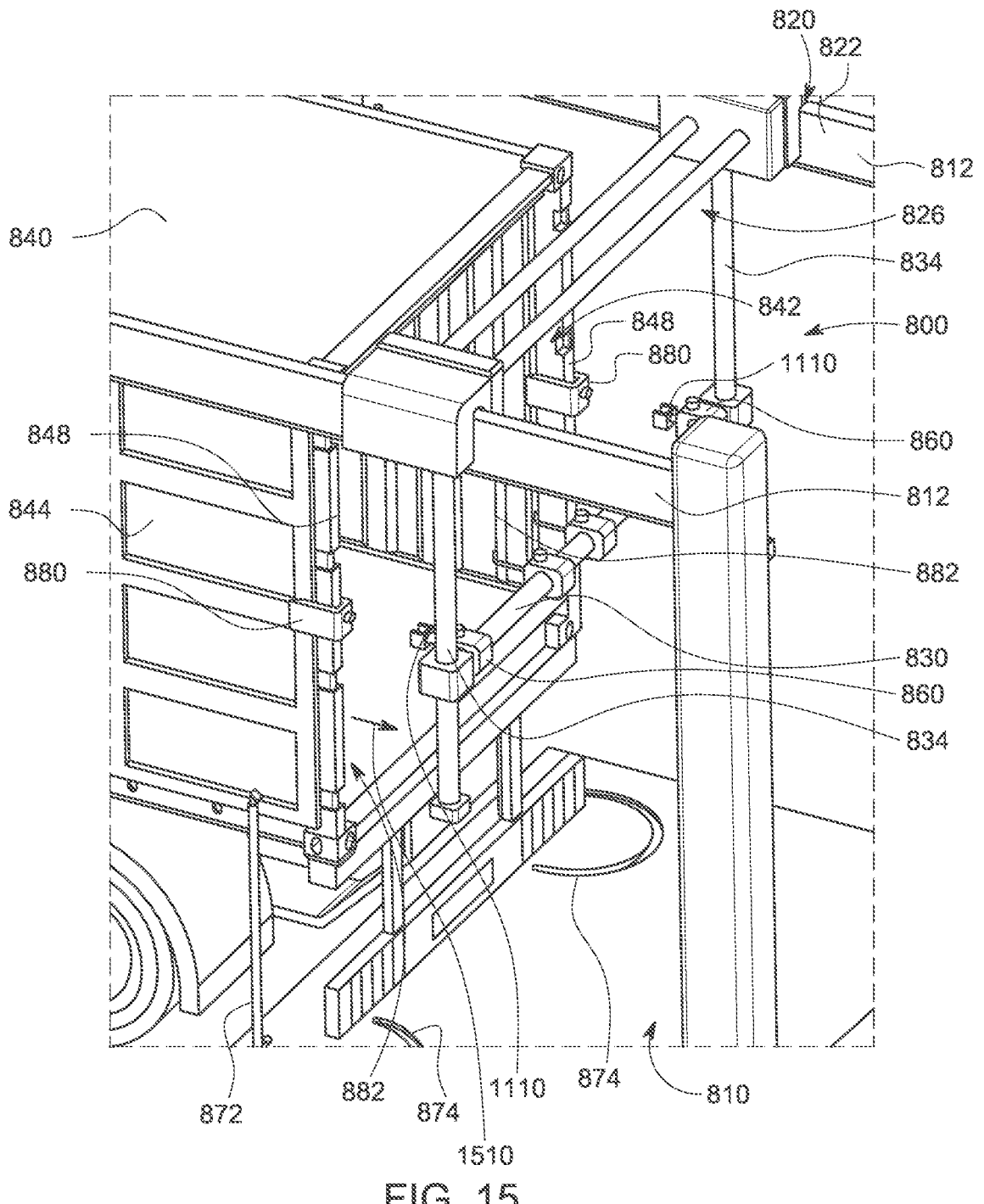
FIG. 15 is a fragmentary perspective view of the exemplary trailer rear and door station of FIG. 8, showing the open-door-fixing mechanism moving away from the edges of the swung-open doors, with the clamps released from the grippers and securing the doors in swung-open positions.

In operation, as shown in FIG. 13, once the doors are swung open by the posts 872, the linear slide 826 moves forwardly (arrow 1310) on the top beams 822 to move the clamps 880 (gripped by grippers 1110 on the locking/fixing mechanism 860) toward the edges 848 of the swung-back doors 844. Then, in FIG. 14, the forward motion of the linear slide 826 biases the clamps 880 over the edges 848, and into engagement with the swung back doors 844 and trailer sides 882. The gap of width WC between clamp times 1010 (FIG. 10) is smaller than at least a portion of the thickness TD of the stacked/sandwiched door and side so that the tines are flexed (elastically deformed) outwardly as the clamp 880 is driven over the edge 848. The clamp material and elastic deformation of the tines collectively generate a frictional holding force that maintains the door 844 against the side 882 in the swung-back orientation. The posts 872 can now be retracted (arrow 1410) into the floor base 810 (sufficiently to allow clearance with respect to the doors and other trailer components), as the doors are now secured by the clamps 880. Thus, as shown in FIG. 15, the linear slide 826 moves rearwardly (arrow 1510) to provide clearance with respect to the trailer 840 and prepare for the next trailer to enter the station 800. At this time, the clamp grippers 1110 are empty, and can be reloaded with new clamps (880) from a magazine or other source (not shown).

Note that the geometry and material of the depicted clamp 880 is highly variable in alternate embodiments—e.g. it can have a more C-clamp-like appearance with contact pads that are limited in surface area. It can also be constructed from two separate clamp members that are hingedly joined and include (e.g. a separate mechanical (e.g. wrapped) spring. Likewise, the gripper assembly can operate in a variety of ways and employ a variety of mechanical principles to deliver and releasably attach the clamp to the swung-back door. The system (using the depicted clamp 880 or another type of clamp) can include powered and/or non-powered release mechanisms—for example a mechanism that releases the clamp when the slide 826 is driven sufficiently onto the door edge 848. It is desirable generally that the station swing the doors back and then apply a holding device that can be later removed by a robot or manual operator when no longer desired—for example, after loading is completed.

In an alternate embodiment, the functions and/or operation of the door station can be implemented using a mobile door-opening mechanism. The mechanism can be mounted on the trailer at the (e.g.) guard shack or integrated into the trailer.

Another form of mechanism can be provided on a moving base (e.g. a commercially available or custom mobile robot) deployed to the trailer and perform the same functions as the station at (e.g.) the time of hitching or unhitching to and from the AV yard truck. The robot can be autonomous, using on-board sensors, and/or guided by an operator. Such robots are currently employed in military, law enforcement and other tasks in which remote manipulation is desired tasks and can be adapted to the present embodiment.

D. Robotic Sled

Figure 16:
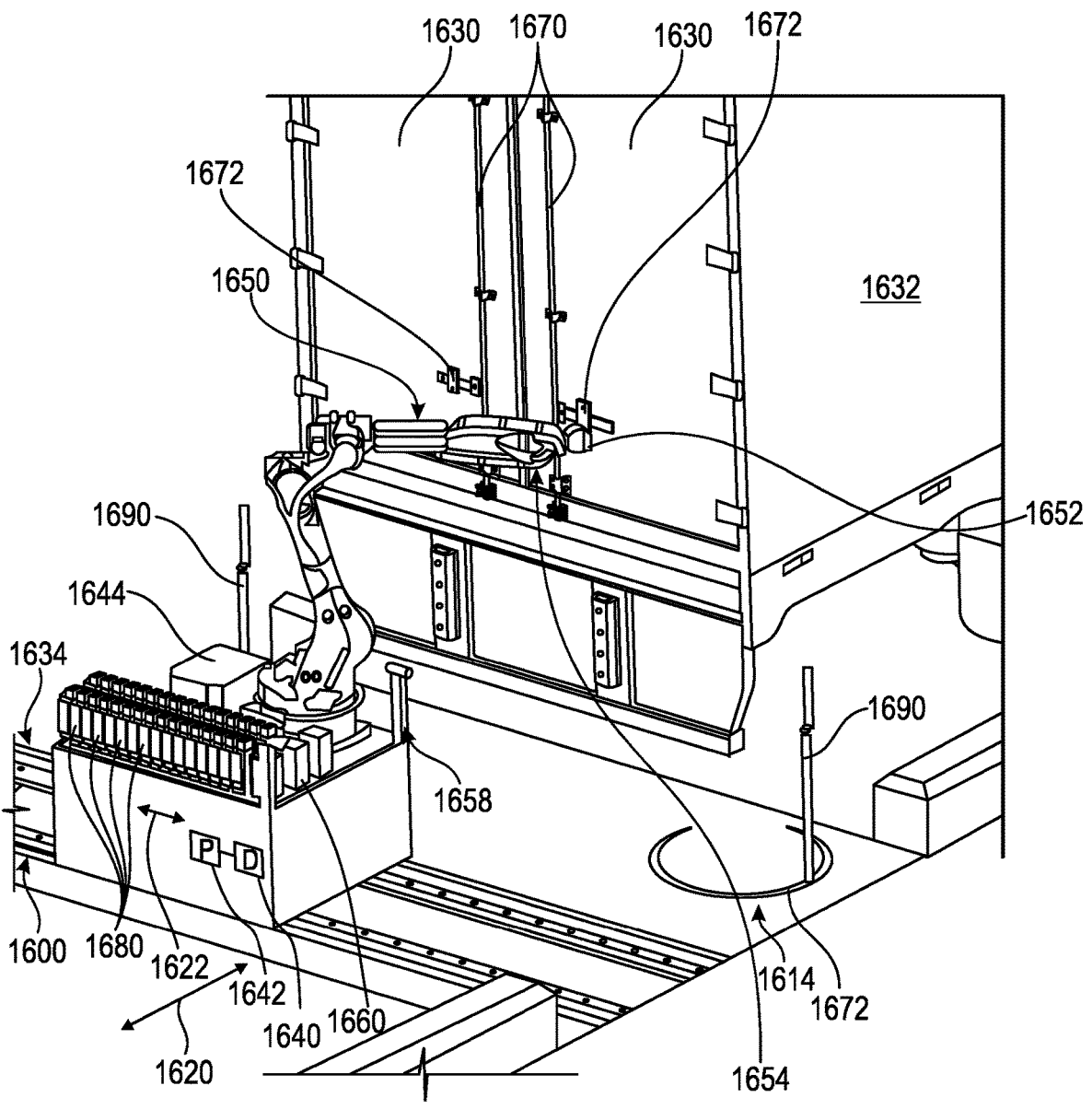
FIG. 16 is a perspective view of a door opening (and closing) station according to an illustrative embodiment detailing sled with robotic arm manipulator.
Figure 17:
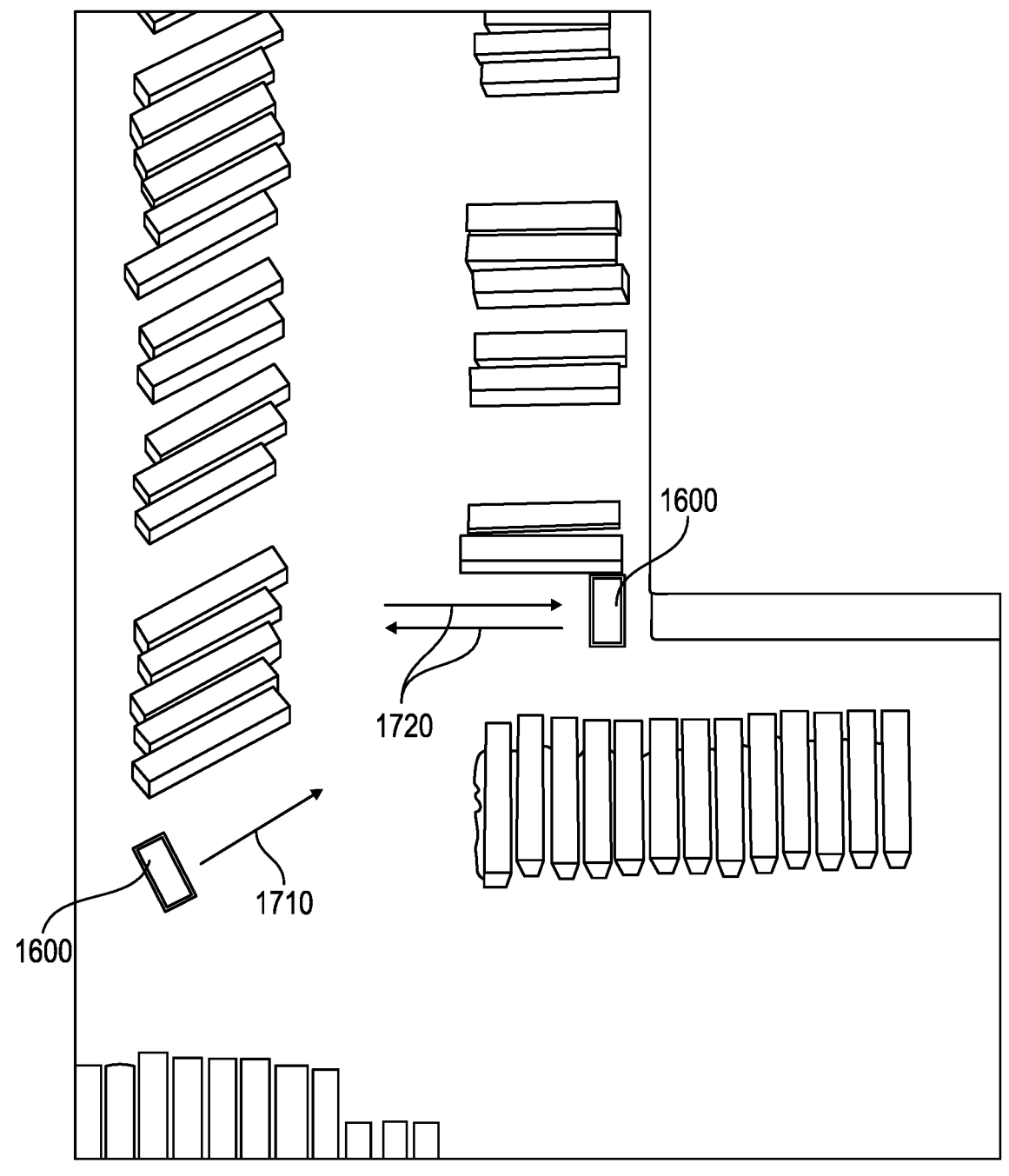
FIG. 17 is a plan view of an exemplary yard/facility showing possible locations for drive-through and back-in stations according to FIG. 16.

Reference is made to FIG. 16, which shows a trailer door opening mechanism and associated station 1600 according to an illustrative embodiment. As shown further in FIG. 17, the station arrangement 1600 can be strategically located in a facility/yard 1700 at a plurality of drive-through (indicated by arrow 1710) or back-in (indicated by arrows 1720) locations as appropriate to the logistics mission of the facility/yard. In this exemplary implementation, the arrangement 1600 comprises a sled 1610 that rides on (e.g.) a pair of tracks 1612 and 1614 that are oriented transverse (e.g. perpendicular) to the direction of truck/trailer travel (double-arrow 1620). As used herein, the term "sled" can be taken broadly to define and acceptable mobile platform operating at a station designed/designated for opening and/or closing doors of a trailer, which can include manipulator(s) for opening and closing swing doors as well as various sensors and cameras that assist in this process, and also enable accessing cargo for inspection and record keeping. As described in various embodiments, in addition to a ground-mounted sled or other mobile robotic device travelling on the ground, such an open/close/inspection arrangement can also be directed to the trailer rear from an overhead position, or can be swung over behind a trailer. The track 1612, 1614 can be any acceptable guiding arrangement that allows the sled to move in each of opposing directions (double-arrow 1622) between a location that confronts the rear doors 1630 of the trailer 1632, and a position (e.g., to the left side 1634 as shown) that is non-interfering with motion (double-arrow 1620) in either a back-in/drive-out and/or drive-through operation. The tracks 1612, 1614 can include a gear rack (not shown) that interoperates with a pinion gear P 1642 that is driven by (e.g.) and electric drive motor D 1640 under control of a processor 1644. The processor 1644 can be housed at any location on the sled 1610 and/or can be partially (or fully) instantiated remotely—for example by the facility server 120. The sled 1610 and associated processor 1644 can communicate with the server 120 and other facility peripherals (including AV trucks) via wired and/or wireless links operating appropriate communication protocols and standards—for example TCP/IP, Ethernet, WiFi, Bluetooth®, etc.—in a manner clear to those of skill. Note also that the exemplary rack and pinion drive can be substituted for any type of linear drive system, for example electromagnetic linear motors, hydraulic/pneumatic rams, elastomeric tires, crawler tracks, etc.; and can be driven by one or more motor(s) powered by any acceptable energy source, such as line-based (AC) or battery/solar-based (AC/DC) electricity, compressed air, fossil fuel/hydrogen, (running an internal combustion or Stirling engine), compressed air, etc. The tracks are constructed from sufficiently durable material (e.g. steel) to endure long and rough use in a variety of weather conditions and/or extreme cyclic loading (from the weight of truck wheels).

It should be noted that as used herein, the term "station" can either refer to a fixed, predetermined location to which the trailer is directed and parked for a door opening/closing (and related) operations, or can refer to a movable station, which can be relocated as appropriate to serve one or more trailers.

More generally, it is contemplated that tracks can be substituted with alternate arrangements that allow the sled to move generally transverse to the direction of truck/trailer travel and access the doors. The sled can be GPS guided with crawler tracks or similar driven wheels, or can follow markers in the roadbed at the station. The sled should remain sufficiently stable to allow the manipulator to perform required tasks free of slippage. As such, retractable pads can be employed to fix the sleds motion between tasks in certain embodiments.

Moreover, it is expressly contemplated that the term "trailer" as used herein should be taken broadly to include both conventional semi-trailers and intermodal container with swinging doors, which has been loaded on a wheeled chassis for haulage by a truck. The above-incorporated The tracks 1612, 1614 and sled can be optionally covered by a roof (not shown) with sufficient clearance for the truck and trailer to pass and/or for the sled to traverse the path of truck travel. Note that the sled can include appropriate structures—for example, flanged wheels—to maintain the transverse travel path. The sled 1610 includes a multi-axis robotic arm/manipulator 1650 with an end effector 1652. Any acceptable multi-axis robot arm can be employed. By way of non-limiting example, to further illustrate the principles of the embodiment, a six-axis GP25 robot, available from Yaskawa can be employed. This model allows for at least 2 meters of reach (e.g. 1730 mm horizontal and 3089 mm vertical). The end effector 1652 can be a single, fixed structure—for example, a set of gripper fingers of custom or conventional design, or can be adapted to dock with a variety of specialized tool available in a stowage stand or magazine 1660 located on the sled 1610. By way of further description, commonly assigned U.S. patent application Ser. No. 18/219,618, entitled SYSTEMS AND METHODS FOR AUTOMATED OPERATION AND HANDLING OF AUTONOMOUS TRUCKS AND TRAILERS HAULED THEREBY, filed Jul. 7, 2023 teaches generally a robot used to connect the pneumatic brake gladhand (and other connections) of a trailer to an AV yard truck using a plurality of custom connection tools. The teachings of this application are incorporated by reference as useful background information.

The end effector and/or other tools is/are used to release the conventional flip-up safety hasps on each of the doors 1630 and grasp the handle 1672 on each lock rod 1670. This task typically occurs for each door, in turn. The handles 1670 are rotated in a conventional manner by the end effector 1652 to thereby unlock the respective door 1630. The distal end of the robot arm 1650 can include one or more camera(s) 1654 and/or other sensors (radar, LIDAR, ultrasound, etc.), which communicate with a conventional or custom machine vision/pattern recognition process (operating on the processor 1644 or elsewhere in the system) that should be clear to those of skill. The machine vision system can operate using conventional pattern recognition procedures and/or AI based procedures. It is trained to recognize the type of door lock and relative location of door/lock components—for which appropriate tools can be selected to handle such lock. Note that additional cameras and sensors (see above) 1658 can be provided on the sled 1610 to provide further information on the doors and their location. Other cameras and/or sensors can be provided at an appropriate location in the station 1600 to sense the arrival of a trailer and coordinate startup, movement and general operation of the sled/robot (1620, 1650). Additionally or alternatively, startup can be initiated by a manual button/touch screen (not shown) located at the threshold of the station 1600 and accessible by the driver (in a manually driven embodiment). More generally, the system determines when a trailer is appropriately positioned for the station to open/close doors and can signal the driver/AV truck to stop for performance of the door open/close task.

Note that it is expressly contemplated that the sled can include multiple manipulators with similar functionality (for example, similar to FIG. 7 above), thus allowing two doors to be opened/closed simultaneously. Alternatively, or additionally, each of the plurality of manipulators on a sled can each be adapted perform a different/discrete function in the overall door-opening/closing process. Likewise, as described below, a plurality of sleds with one or more manipulators can operate on the doors.

As described below, the sled includes a supply of door clips 1680 similar to those described above. These are adapted to secure the door 1630 in the opened position. Additionally, the station 1600 of the exemplary embodiment includes a pair of swing posts 1690 that are either powered or unpowered, riding in semi-circular slots as described above. In an exemplary swing post arrangement 1690, 1692, the posts are generally moved into an interfering position with the open door using the end effector 1652. In a powered embodiment a motor of appropriate design and configuration causes the posts 1690 to move on their slots 1692 based upon a command from the processor 1644.

In a further alternate embodiment, the posts can be adapted to act passively, free of power or manipulation by the robot arm. In such an implementation, the posts can be adapted to yield when a door is opened by the arm, but then provide reasonable resistance force to reclosing of the door thereafter. Likewise, the posts can be adapted to rotate (e.g.) 180 degrees to assist in closing doors. A metallic, gas or other spring assembly can be adapted to provide appropriate rotational spring force in, for example, the post base.

With reference now to FIGS. 18-25 the operation of the station 1600 and its sled 1610 and robot manipulator arm 1650 to open trailer swing doors is now described in detail.

Figure 18:
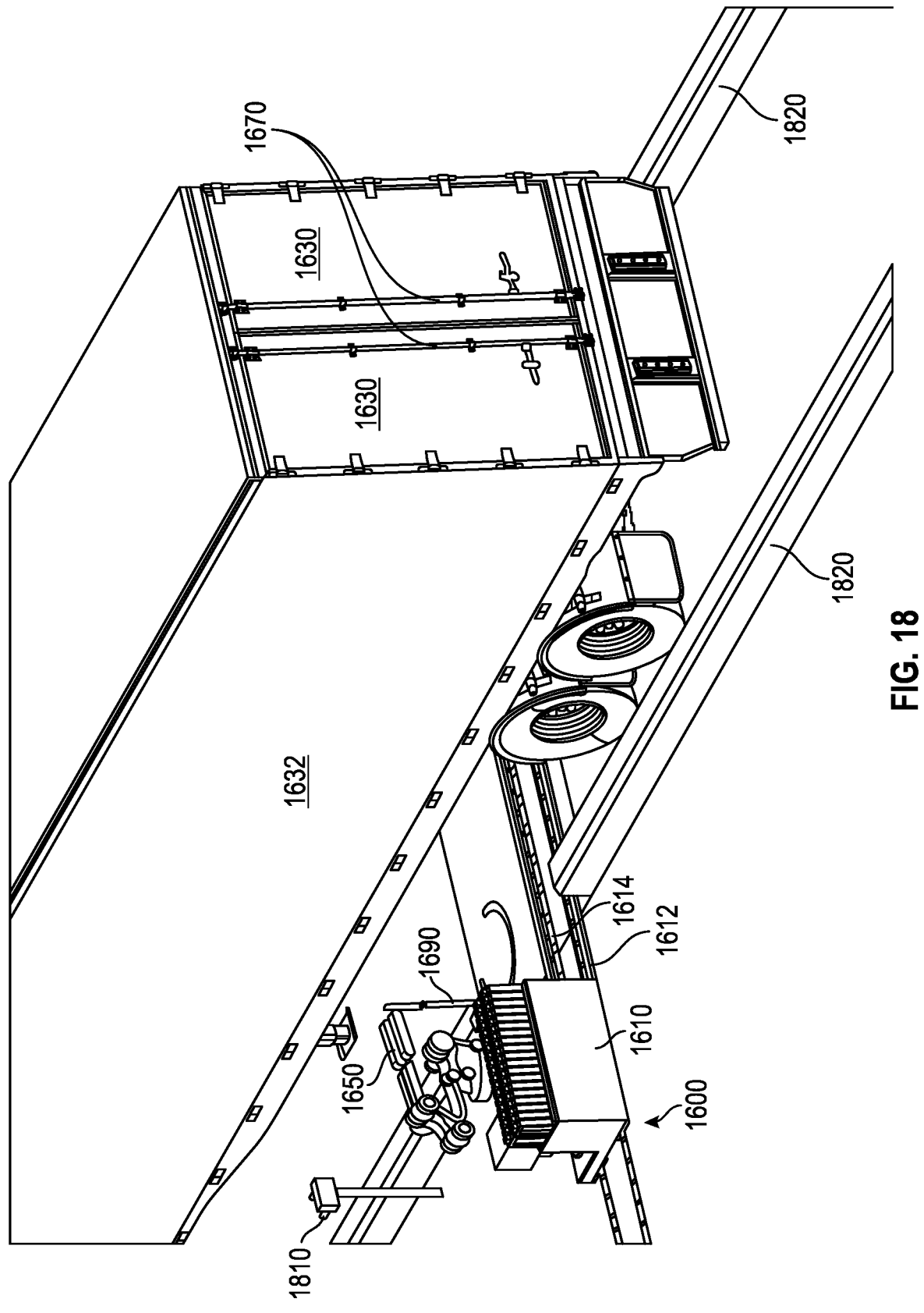
FIGS. 18-23 are perspective views showing steps of operation for the opening of trailer doors by the station of FIG. 16.

In FIG. 18, an AV or manually-driven truck and trailer 1632 pulls through (or backs into) the station 1600. The truck is detected by cameras, proximity sensors (sonar, LIDAR, etc.), pressure switches and/or the driver pushes a button to activate the system. Camera for trailer face detector+movement. A traffic light 1810, or similar indicator can inform the driver (or the server signals the AV truck) when the trailer 1632 is in proper position for opening the doors 1630. As noted above, the sled and/or station can include appropriate sensors for signaling the driver/AV truck to stop at the proper position. As shown, the posts 1690 are located out of interfering contact with the trailer in this illustration. Note that the station can include curbing 1820 to assist in guiding the truck and trailer within the station.

Figure 19:
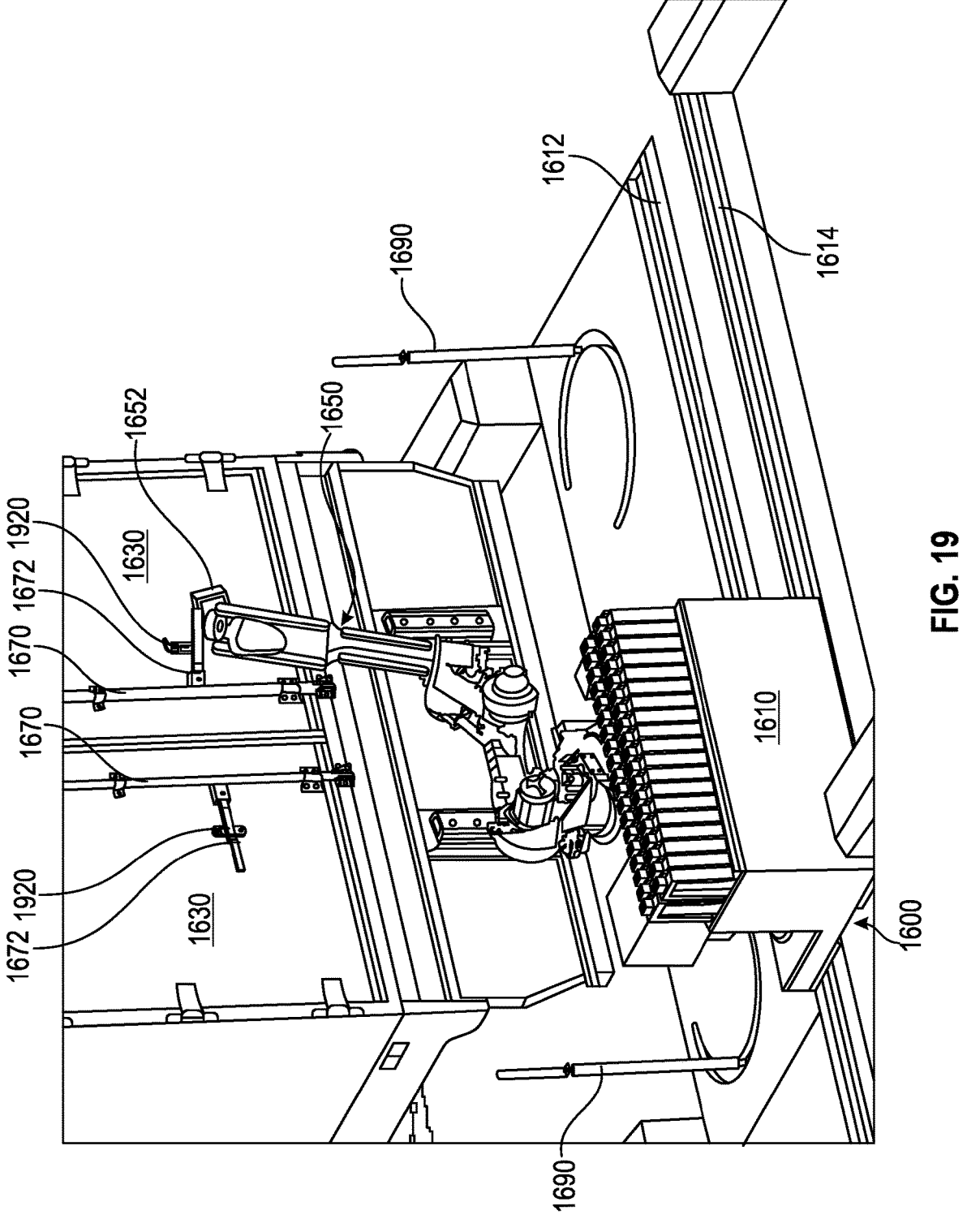

As shown in FIG. 19 the sled 1610 then moves behind the trailer, and one or more deep-learning driven robotic manipulator(s) (e.g. manipulator arm 1650) with one or more conventional or specialized tools on the end effector 1652. The manipulator 1650 is shown opening the right side door 1630 after releasing the safety hasp 1920, and rotating the lever 1672.

Figure 20:
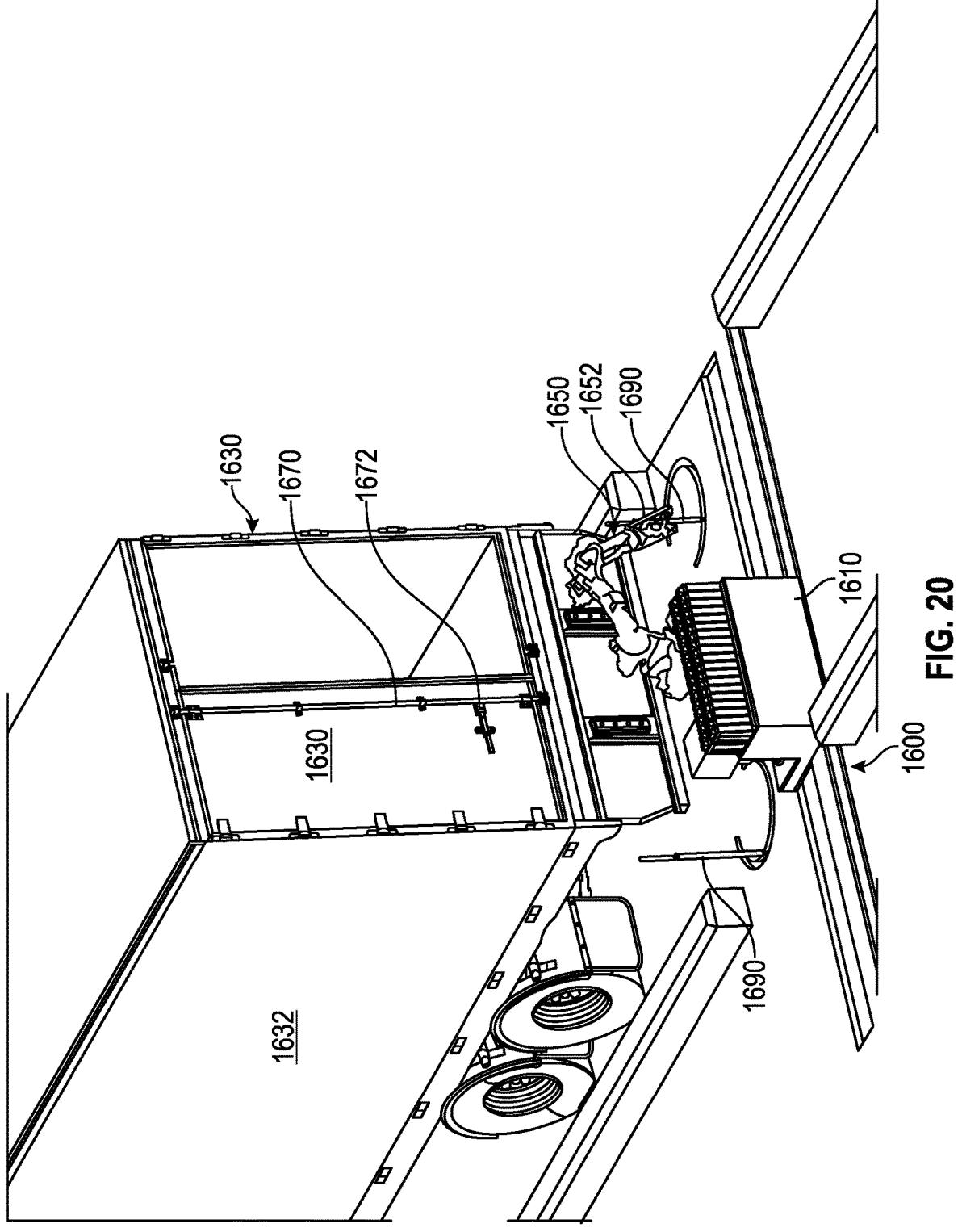

Then, in FIG. 20 the end effector 1652 of a robot manipulator (e.g. 1650) grasps and maneuvers the swing-post 1690 into position to hold door 1630 open during clip installation procedure.

Figure 21:
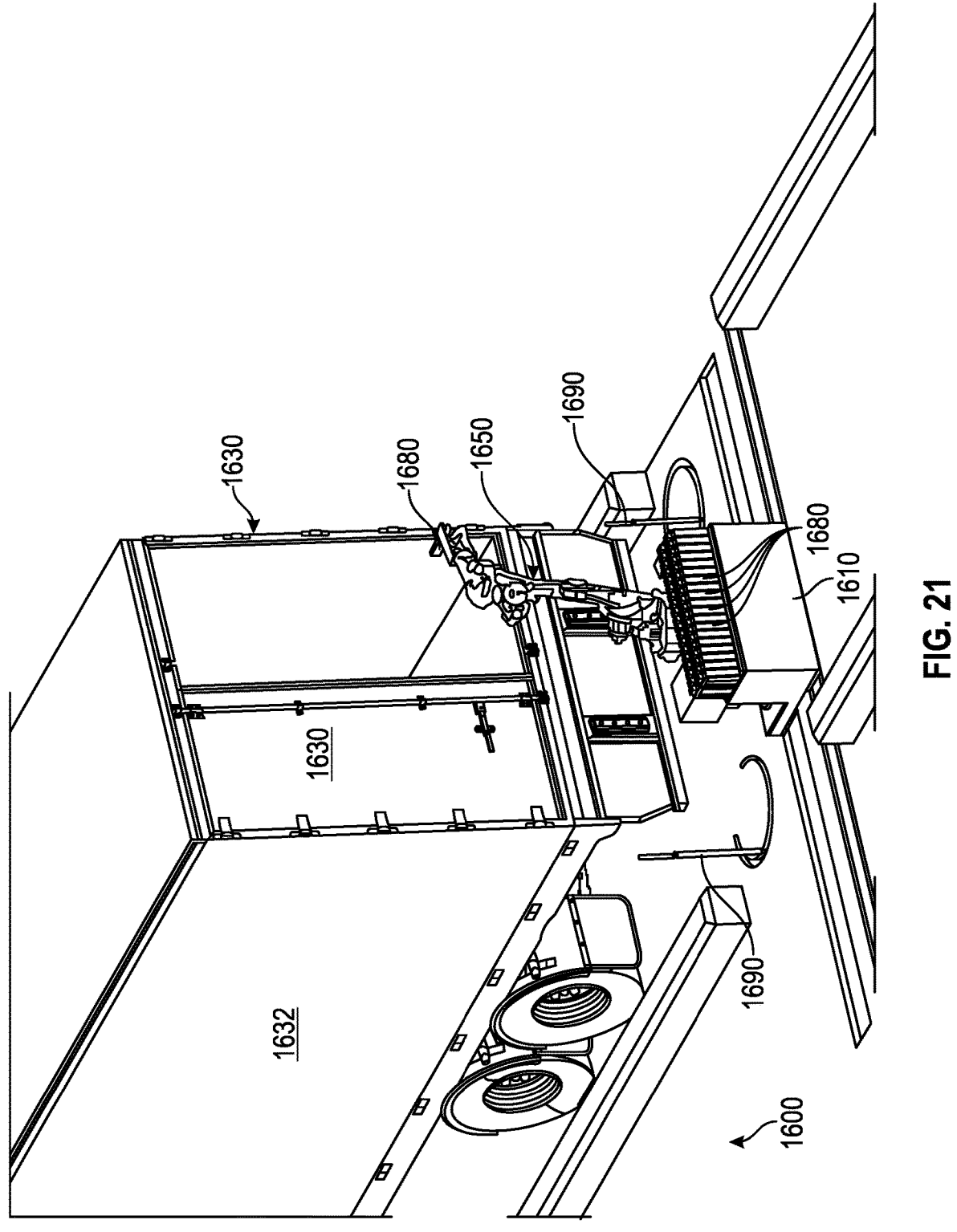

In FIG. 21, the end effector retrieves a door clip 1680 from the rack on the sled and applies it to the opened door at the hinge line as shown. The clip exerts an elastic holding force on the opened door, retaining it against the trailer side.

Figure 22:
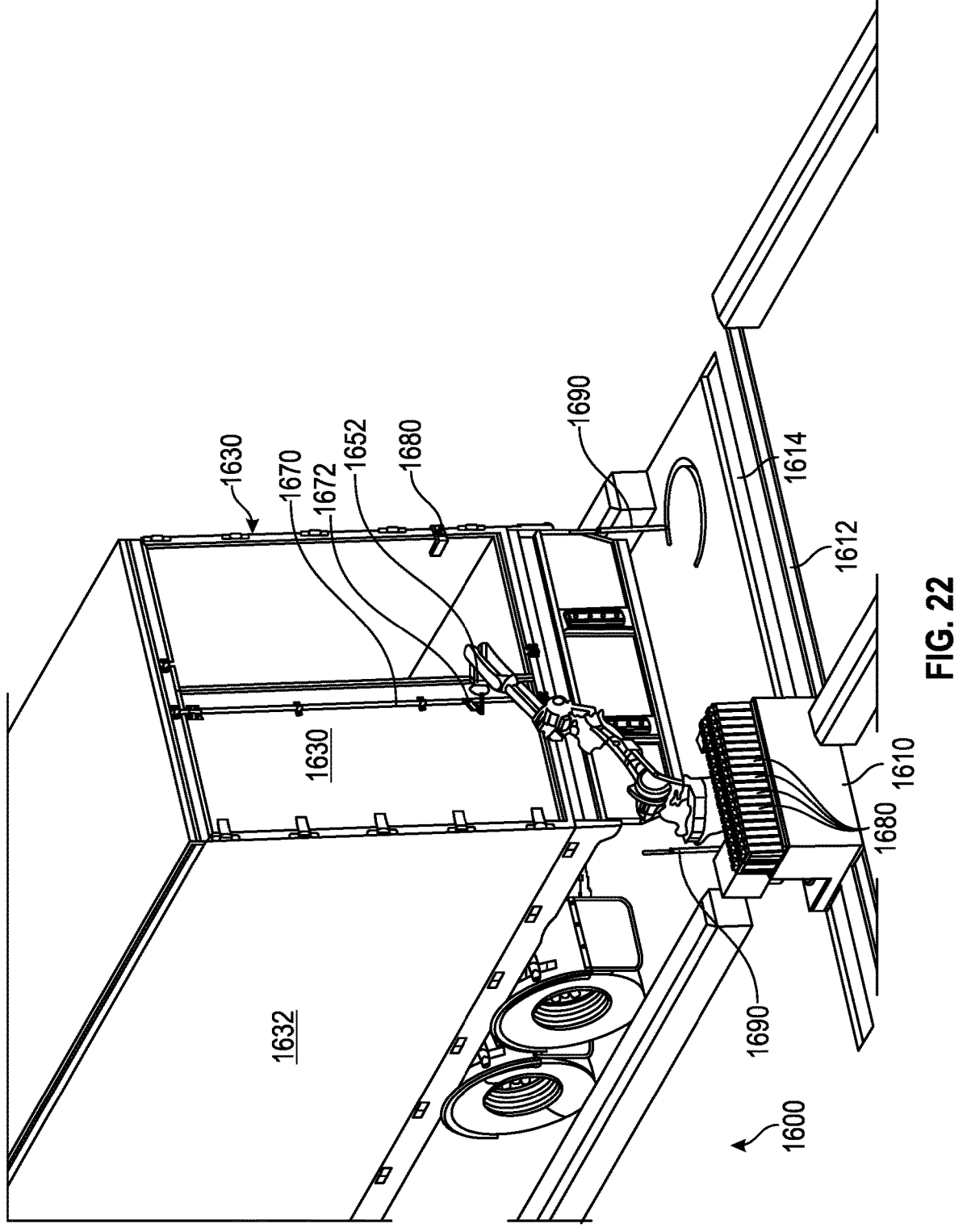
Figure 23:

As shown in FIGS. 22, the procedure is repeated for left hand door 1630. Then, in FIG. 23, after the second door-clip 1680 is installed and swing-posts 1690 are retracted by the end effector 1652 of the robot arm 1650, the trailer 1632 can be moved to loading dock by either a driver or AV truck.

Figure 24:
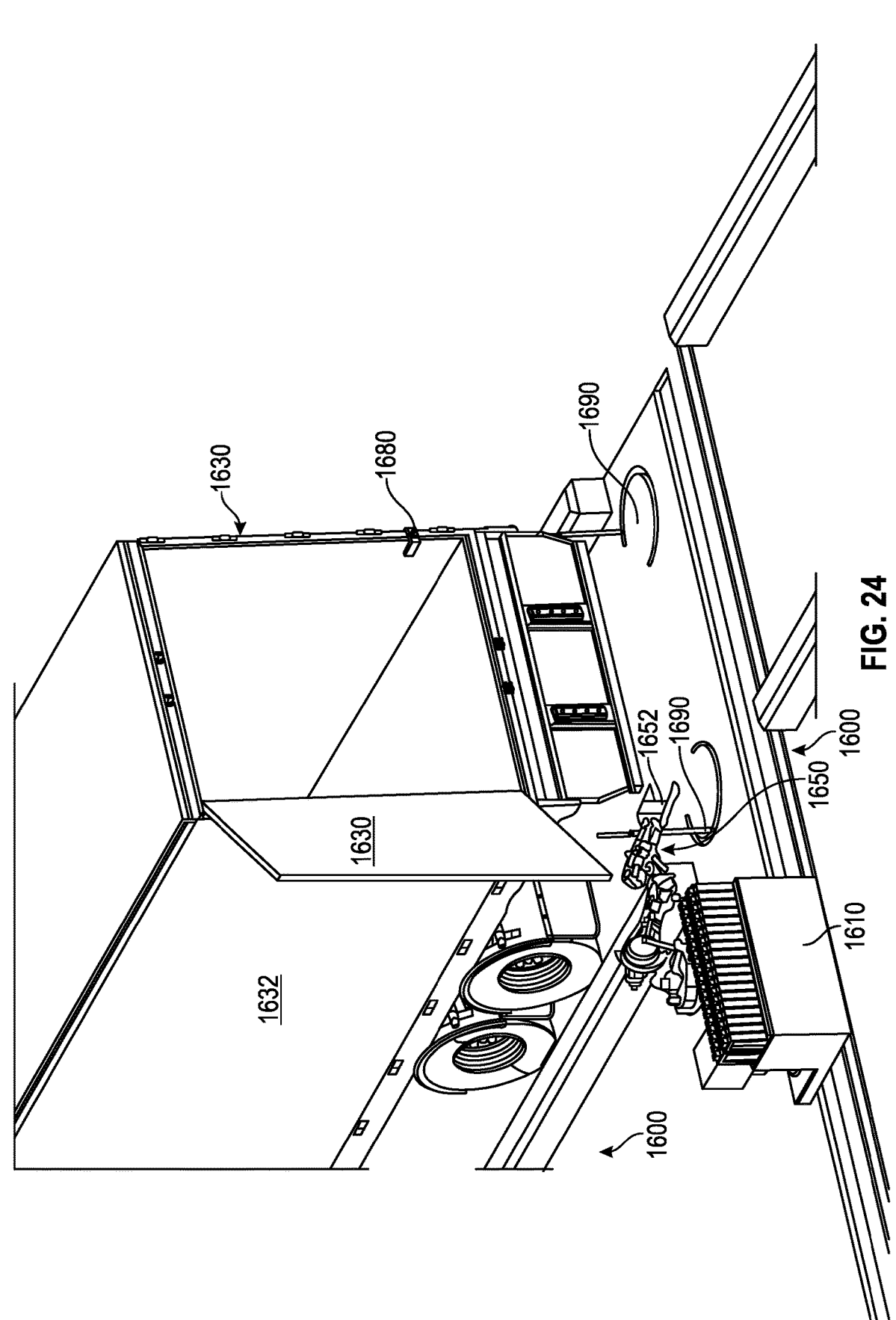
FIG. 24 is a perspective view showing an alternative, closing of a trailer door by the station of FIG. 16.

As shown in FIG. 24, the system can also perform door closing operations. As such, the door clips 1680 are robotically removed and the process is repeated in reverse order from that described above for door closing. Clips 1680 can, thus, be returned to the rack by the robot as they are removed.

Figure 25:
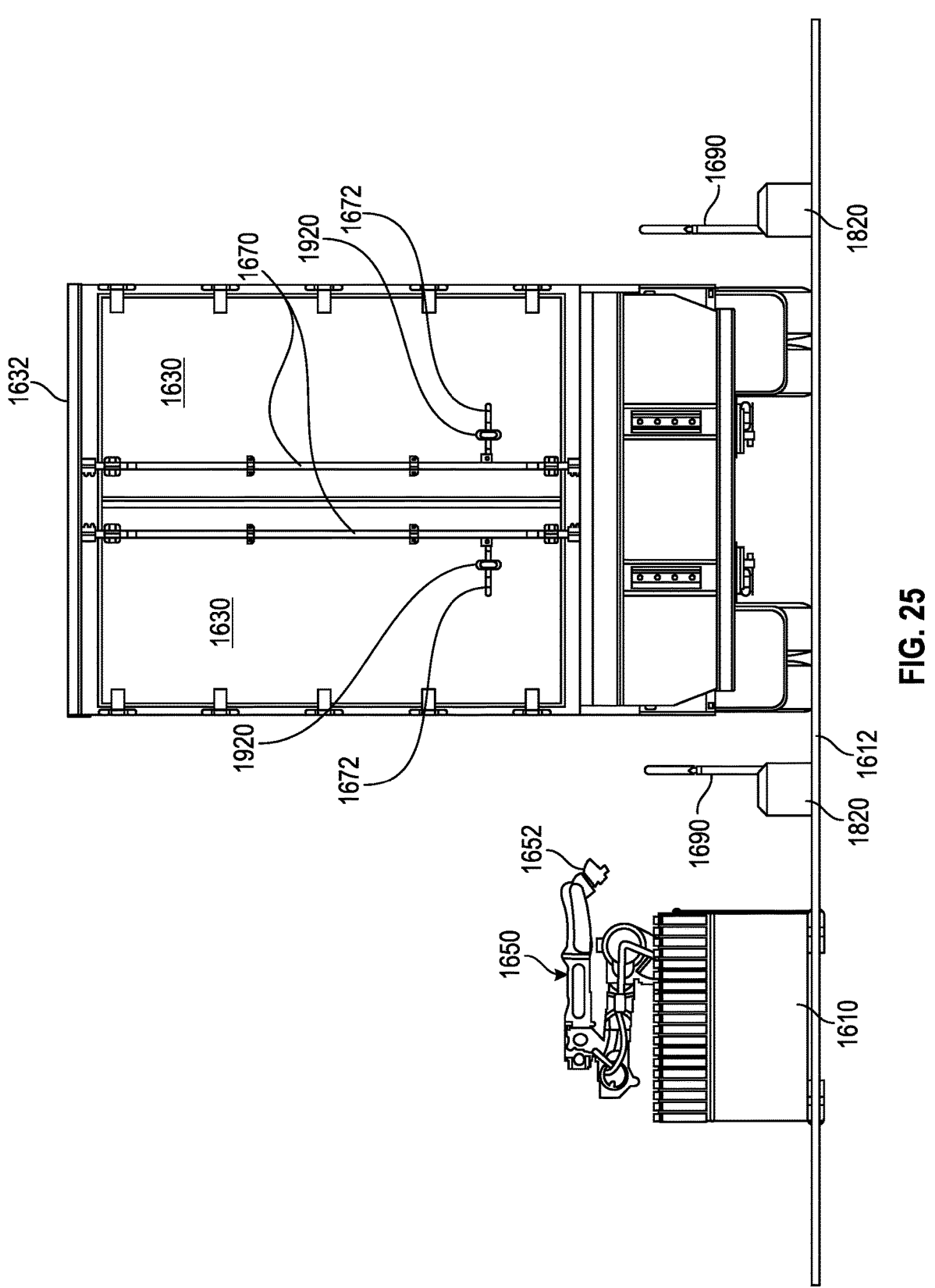
FIG. 25 is a rear view showing a truck/trailer with closed doors prepared to drive away from the station of FIG. 16.

As shown in FIG. 25, the sled 1610 moves away and truck/trailer drives out of the station 1600 when the openings and/or closing operation is completed.

While a single sled is used in this embodiment, it is contemplated that two sleds, each operating on a single door can be employed in alternate embodiments. Likewise, while the manipulator and end effector with appropriate tools can be used to carry out all operations described above, it is contemplated that certain operations can also be accomplished by a purpose-built tool—for example a post and actuator arrangement that retains a stack of clips, retrieves each clip from the stack as needed, and drives it forwardly onto the hinge line of the opened door.

E. Door Retention Clip and Use

Figure 26:
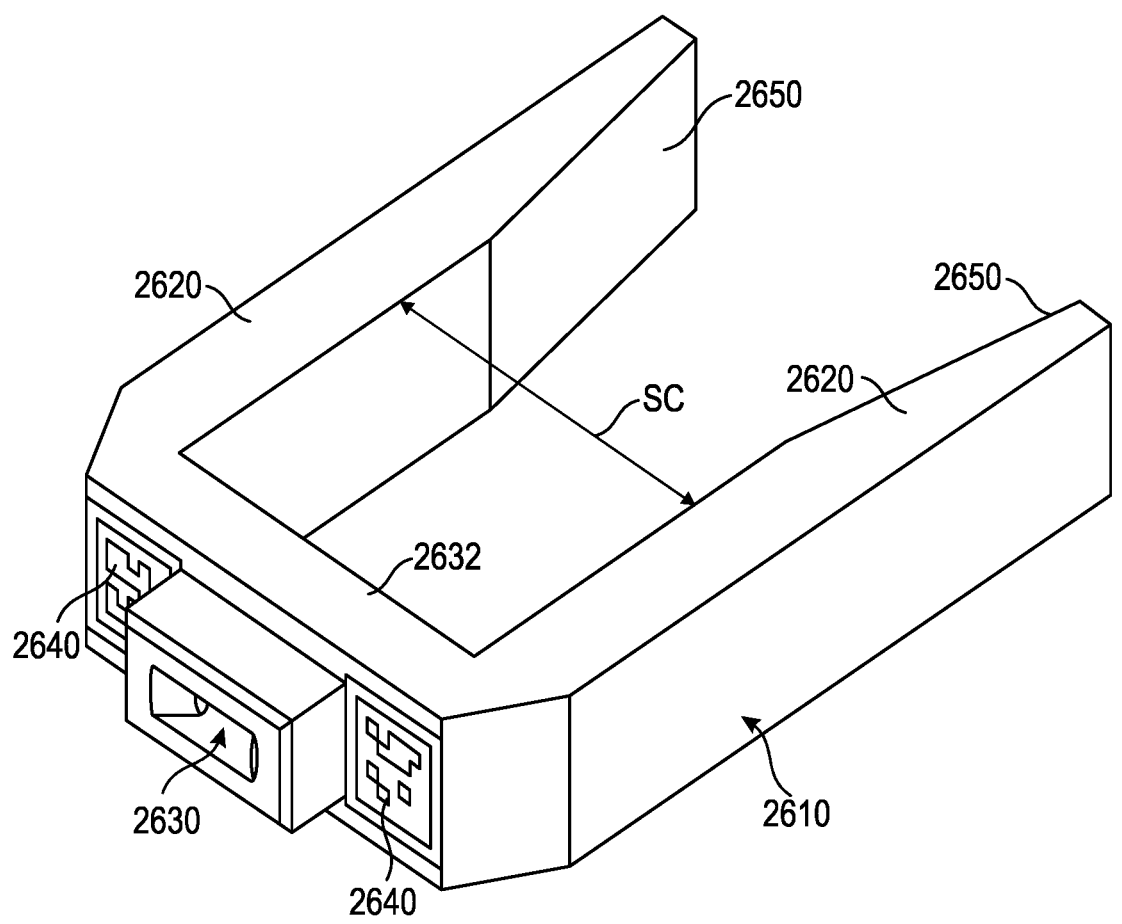
FIG. 26 is a more detailed perspective view of a door retention clip for use with the robotic arm manipulator of FIG. 16.
Figure 27:
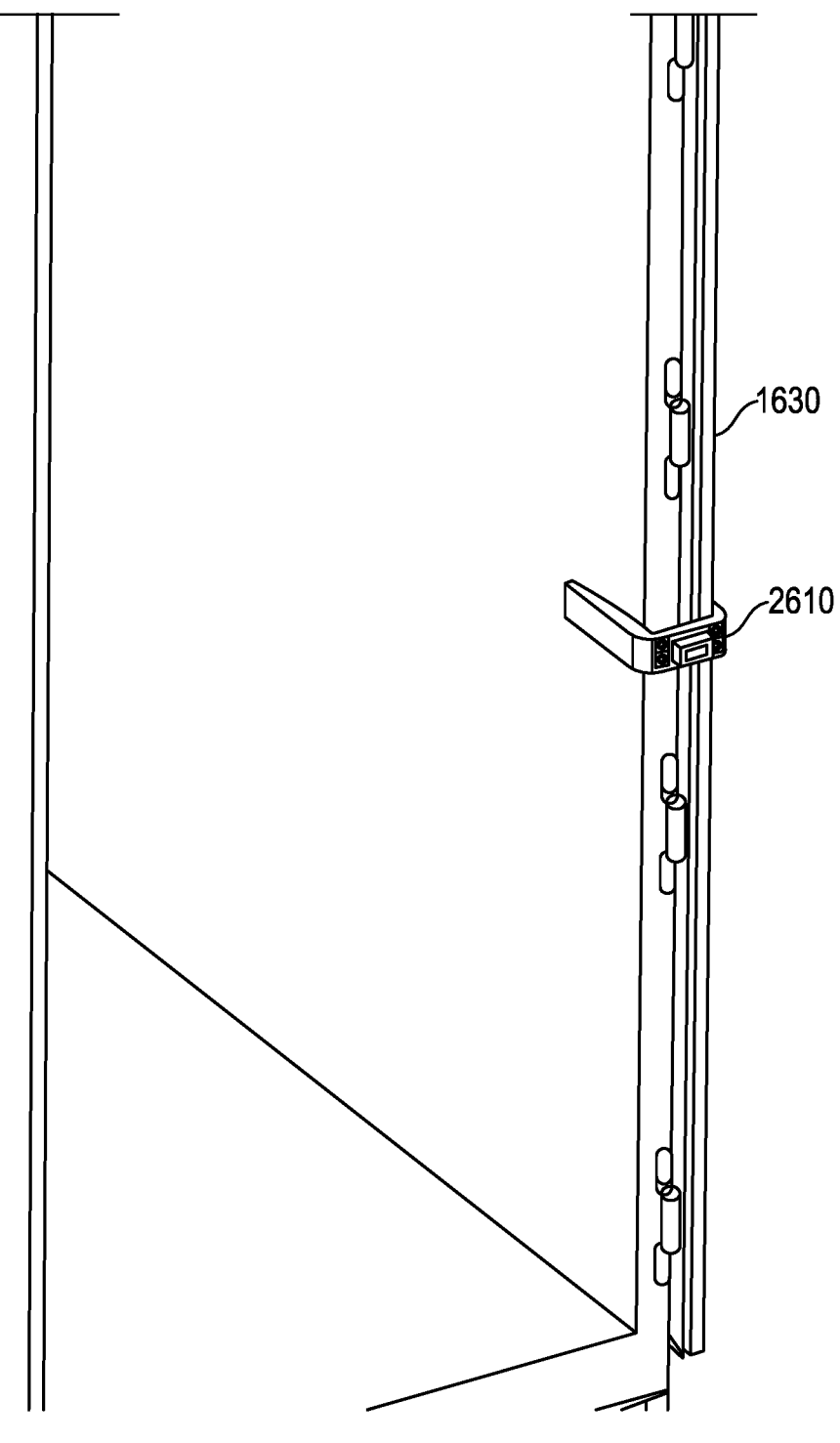
FIG. 27 is a fragmentary perspective view of the door retention clip of FIG. 26 applied to an opened trailer door.

Reference is made to FIGS. 26 and 27, which shows a resilient/flexible/springy (e.g. elastically deformable metal, rubber, various polymers, and/or combinations thereof,) door retention clip 2610 for use with the station of the illustrative embodiments. It is contemplated that the door retention clip 2610 is an inexpensive and potentially disposable implement. The clip's primary features include two flexible or spring-loaded legs 2620 that are spaced apart (spacing SC) such that they can successfully capture and retain every commonly available type of trailer swing door. The clip 2610 also features a tool-changing interface 2630 on its leg-connecting base 2632 so that a robotic manipulator can precisely pick and place the clip. While the clip can easily be removed manually by a human, the clip also has strategically placed fiducial markers 2640 on the outer-facing side of the base 2632 that allow for autonomous removal via robotic manipulator and its associated camera(s) and machine vision system. The distal ends 2650 of the legs 2620 are chamfered to assist in application to the folded door where misalignments are present.

Figure 28:
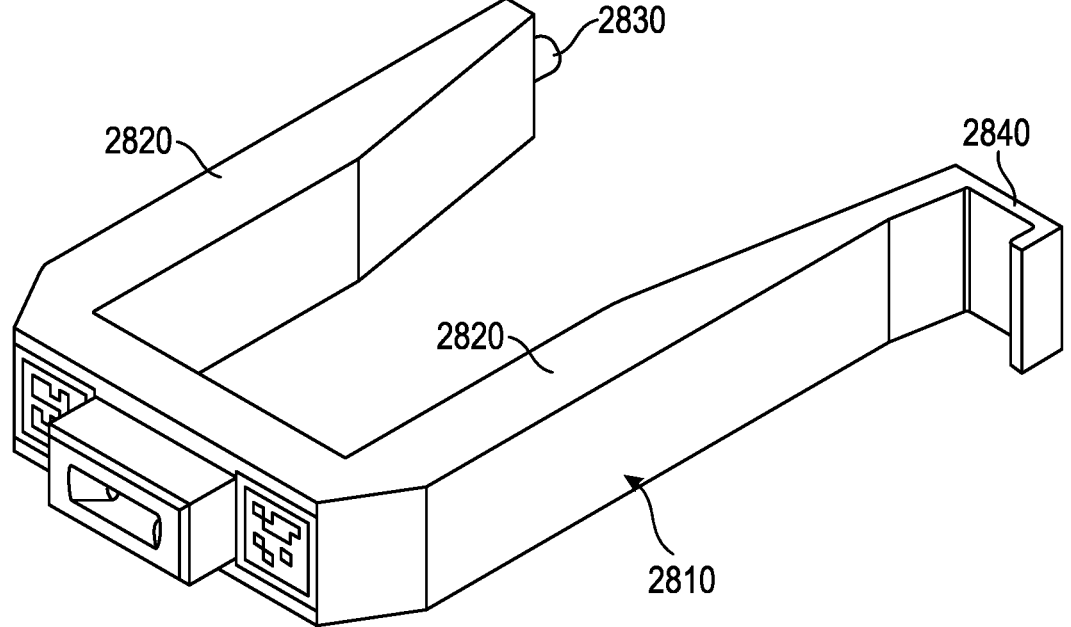
FIG. 28 is a perspective view of a universal door retention clip according to an illustrative embodiment including additional features for unlocking the door in conjunction with motions of the robotic manipulator of FIG. 16.
Figure 29:
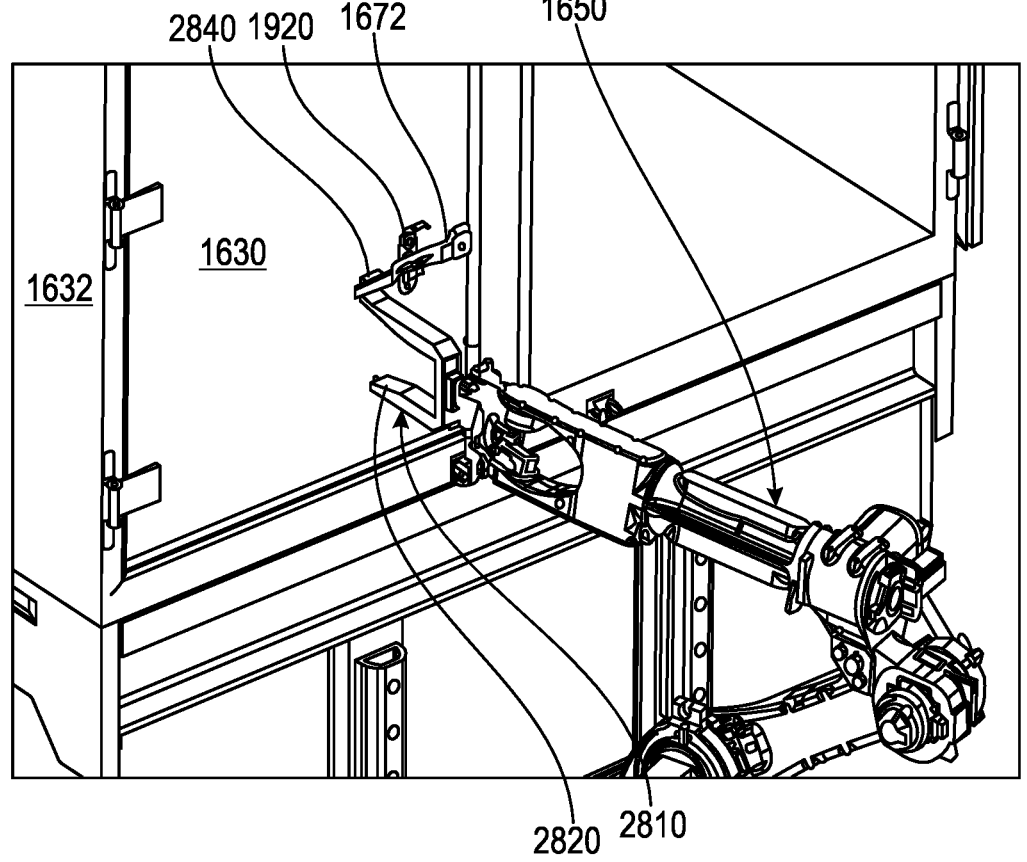
FIG. 29 is a fragmentary perspective view of the universal door retention clip of FIG. 28 being manipulated by the robotic arm of FIG. 16 to unlock the door lock rod.

Reference is made to FIGS. 28 and 29, which show a modified door retention clip 2810 having additional hooks and interaction features that are added to enable the system to complete some or all tasks related to unlocking, opening, and retaining a trailer swing door without the need of additional tools. Thus, the clip 2810 is otherwise designed similarly to the clip 2610 described above, but also includes, on the distal most tip of one leg 2820, a permanent magnet of sufficient strength to engage and flip the safety latch/hasp 2920 (See FIG. 29). The other opposing leg 2822 includes a molded (or otherwise formed) hook 2840 on its distal most that can engage the door handle 1672, and lift/rotate it to unlock the door 1630 (FIG. 29). The robot end effector provides sufficient motion along multiple axes to accomplish the requisite maneuvers.

Figure 29A:
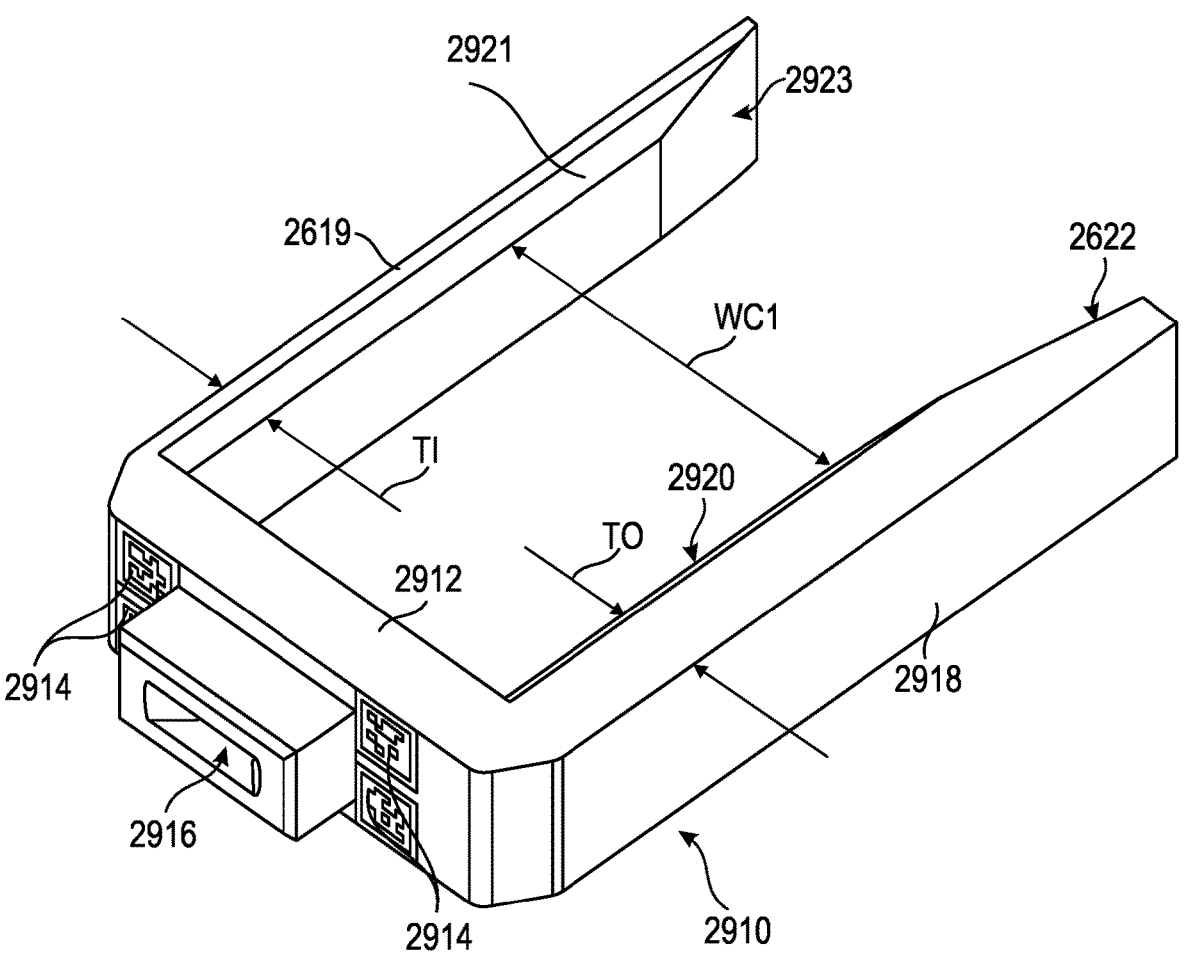
FIG. 29A is a perspective view of a door retention clip with a lowered-profile inside leg that avoids interference with cargo operations relative to the trailer interior according to an illustrative embodiment.
Figure 29B:
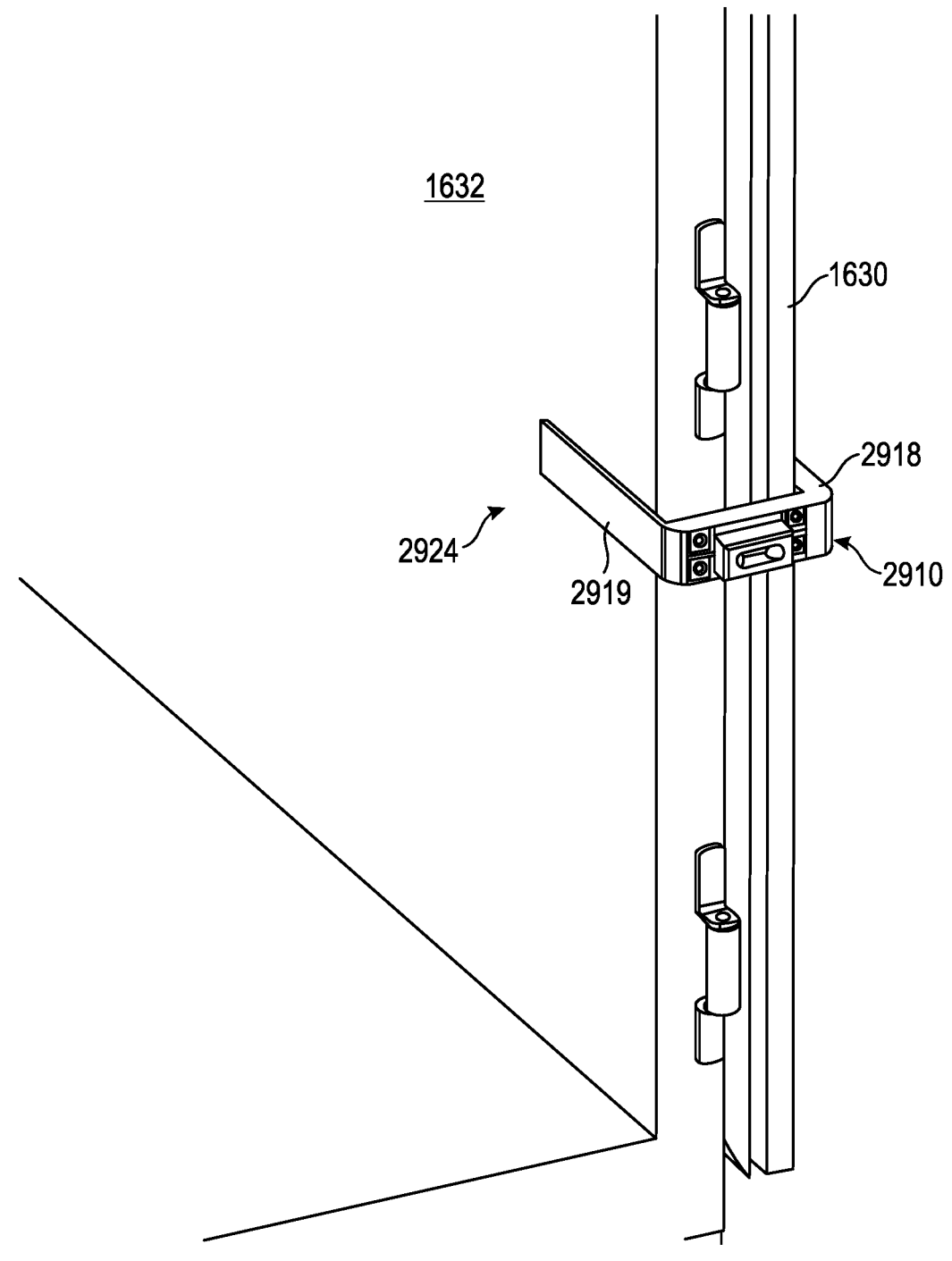
FIG. 29B is a fragmentary perspective view of the door retention clip of FIG. 29A applied to an opened trailer door.

Reference is now made to FIGS. 29A-29E, in which the inside leg of the clip can be constructed from a thin (e.g. metal) material so as to assist in avoiding interference with loading of pallets, movement of forklifts, etc. as they enter and exit the interior of the trailer at the dock. With particular reference to FIG. 29A, a door retention clip 2910 is shown. This clip is constructed from resilient/flexible (springy) material, including various metals, elastomers and/or polymers. For example, the clip can be constructed from aluminum alloy or steel with a polymer or rubberized coating to prevent marring and environmental degradation.

The clip 2910 includes a connecting base 2912 similar to that described above with fiducials 2914 and a tool changing interface 2916 for selectively engaging the end effector of the robotic manipulator. The outside leg 2918 is somewhat thicker (thickness TO—$\frac{1}{2}$-1 inch by way of non-limiting example), while the inside leg 2919 is thinner (thickness TI—$\frac{1}{4}$-$\frac{1}{2}$ inch by non-limiting example). Note that the length of the legs 2918, 2919 in this embodiment, and other clip embodiments herein, is highly variable, and should be sufficient to allow the clips to be retained by the opened door during vehicle motion. For example, a length of 3-7 inches is contemplated, but other lengths are also possible. The width WC1 between legs 2918, 2919, like other clips herein, is chosen to snugly engage a range of folded doors. Thus, the width WC1 can be between approximately 2 and 6 inches. This dimension, and others, can be varied based upon the mission of the clip—for example, specialized doors, such as those used in refrigerated trailers, have different requirements due to added thickness, etc. The elongated inner edges 2920 and 2921 (on one or both leg side(s)) of each respective leg 2918 and 2919 is chambered to assist placement. Likewise, each leg distal tip 2922 and 2923 is chamfered as described above. Fiducials 2914 assist the robot in ensuring that the clip is properly placed with the lower-profile inside leg 2919 positioned relative to the inside face of the trailer. Hence, FIG. 29 shows the clip 2910 with lowered-profile inside leg 2919 confronting the inside face 2924 of the trailer

1632. Hence this clip is less likely to interfere with cargo operations as items and equipment is/are moved into and out of the trailer interior.

Figure 29C:
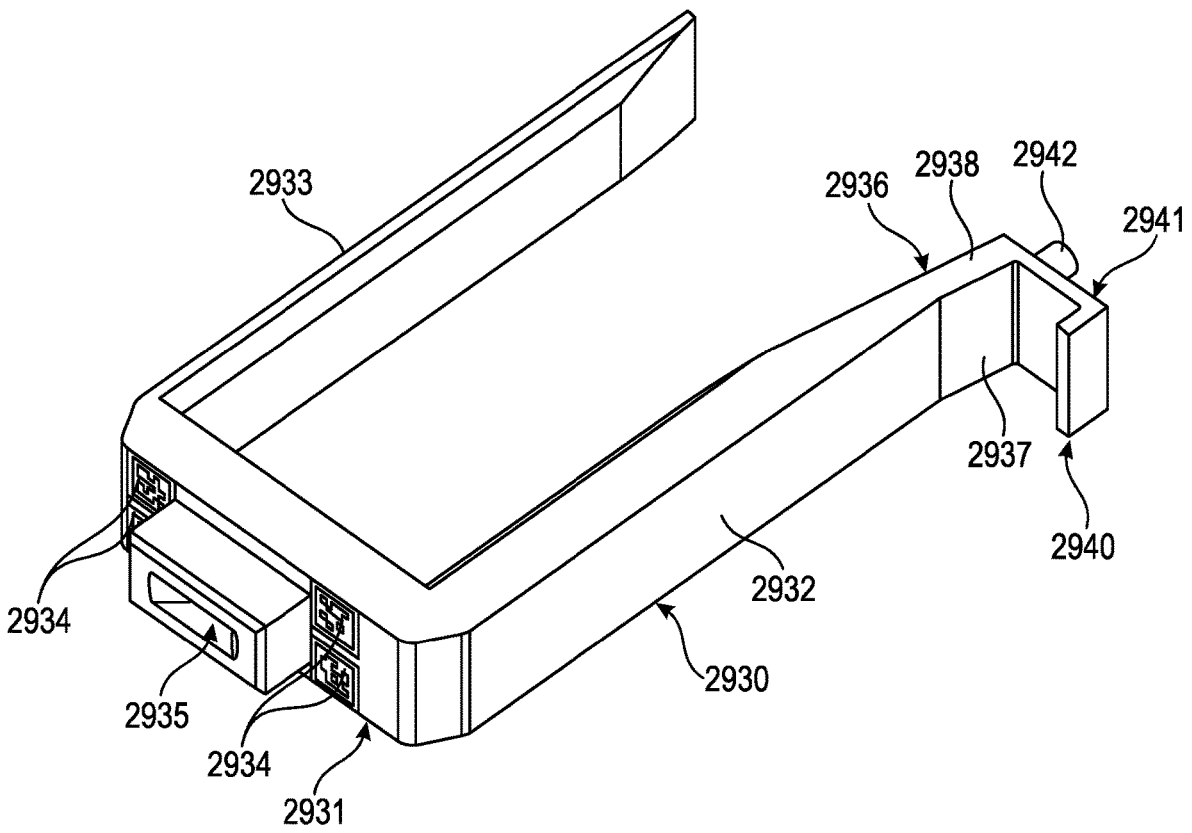
FIG. 29C is a perspective view of a lowered-profile door retention clip including additional features located on the outside leg thereof for unlocking the door in conjunction with motions of the robotic manipulator of FIG. 16.
Figure 29D:
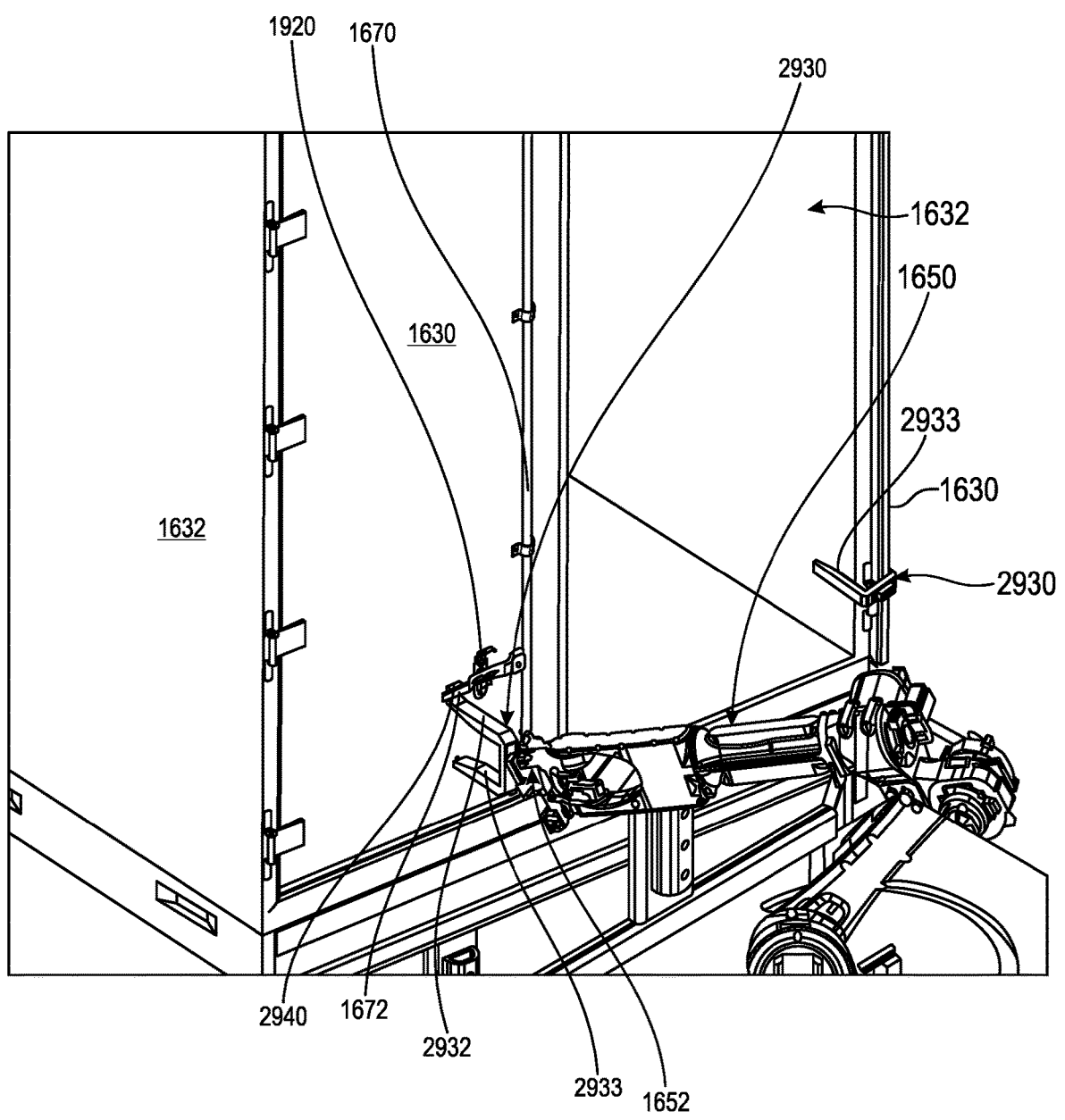
FIG. 29D is a fragmentary perspective view of the universal door retention clip of FIG. 29C being manipulated by the robotic arm of FIG. 16 to unlock the door lock rod.

FIG. 29C shows a version of universal door retention clip 2930 having a base 2931, thicker outside leg 2931, thinner (lowered-profile) inside leg 2933, fiducials 2934 and tool changing interface 2935, similar in material, structure and dimensions to the clip 2910 of FIG. 29A. Notably, the distal end 2936 of outside leg 2932 includes and outwardly angled extension/stem 2937 that partially defines that legs chamfer 2938. The end of the stem 2937 includes a hook structure 2940 that interacts with the lock rod handle in conjunction with motions of the robot manipulator 1650 and its end effector 1652, as shown in FIG. 29D. Additionally, the forward facing face 2941 of the hook 2940 includes a permanent magnet 2942 of conventional design (e.g. a rare earth magnet) with sufficient attractive force to selectively engage and move the handle safety hasp 1920 (FIG. 29D).

Figure 29E:
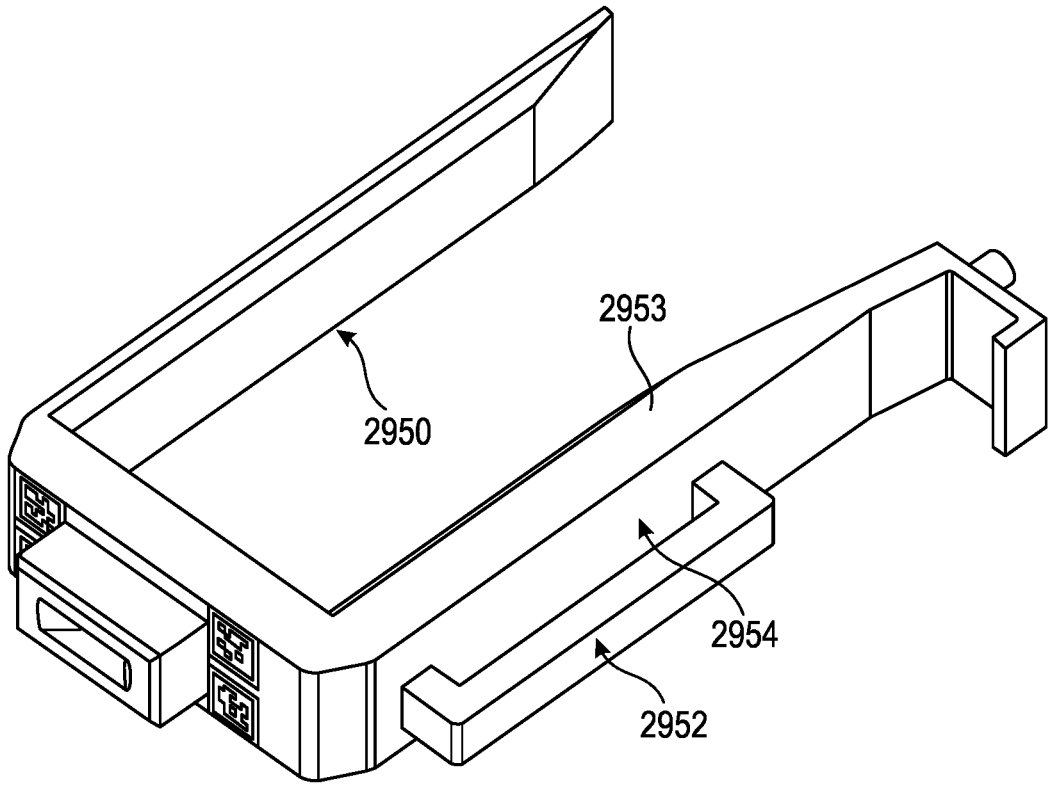
FIG. 29E is a perspective view of a lowered-profile door retention clip including additional features as shown in FIG. 29C, and further including a grasping handle for manual manipulation, all located on the outside leg thereof.

FIG. 29E shows a version of the universal door retention clip 2950 that includes similar dimensions and features to those of clip 2030 in FIG. 29C. This version of the clip 2950 is particularly adapted to assist a human user in manual removal from the door via a graspable handle 2952 installed on the outside leg 2953, which includes a gap 2955 sized and arranged for gripping fingers to grasp and remove (or place) the clip 2950. Such clips can be used exclusively by the manipulator or stored in combination with non-handled clips, depending upon whether the facility environment includes manually driven or AV trucks (partially or fully).

III. Cargo Protection and Additional Features

An additional feature and benefit of the door opening station 1600 in the various embodiments herein is that their sled and robot-mounted cameras can provide record of proper sealing/loading of trailer on arrival and load on door closure. A trained AI-based machine vison system can system note any irregularities within the trailer. In particular, one or more sled-mounted cameras can be adapted to scan for any loose or precariously placed cargo prior to fully opening doors. Alternatively, or additionally, the robot manipulator can be programmed to sense for any excessive door pressure (i.e. cargo pushing on door) and will return to closed position for manual assistance.

It is contemplated that the system can be adapted to operate with certain specialized swing door configurations. As such additional specialized tools can be provided on the sled, for example, to cut a dock seal or sealing of the doors when such additional features are generally required by the operator of the facility/yard or otherwise recognized by the machine vision system or a manual operator. More particularly, specialized tools can be provided available for operation of non-standard door locking mechanisms (e.g. the Wabash Trustlock®). It is also noted that the system is compatible with folding TrailerTail® rear-drag aerodynamic devices, and/or other drear-drag devices. By way of non-limiting example, such additional tools can include hooks, zip-tie cutters, etc.

Various states and alerts are communicated to the operator and server as appropriate. For example, any rejected (or infeasible) door opening procedure is noted to AV or, for a manually driven truck, to driver with blinking lights (for example the light stand 1810 in FIG. 18. Lights can also be provided directly on the sled to indicate proper positioning/status to the driver and/or system operators. More generally, the system can be controlled and monitored through a web-based interface that can be accessed by a user's laptop, tablet, PC or smartphone.

IV. Operational Procedure

Figure 30:
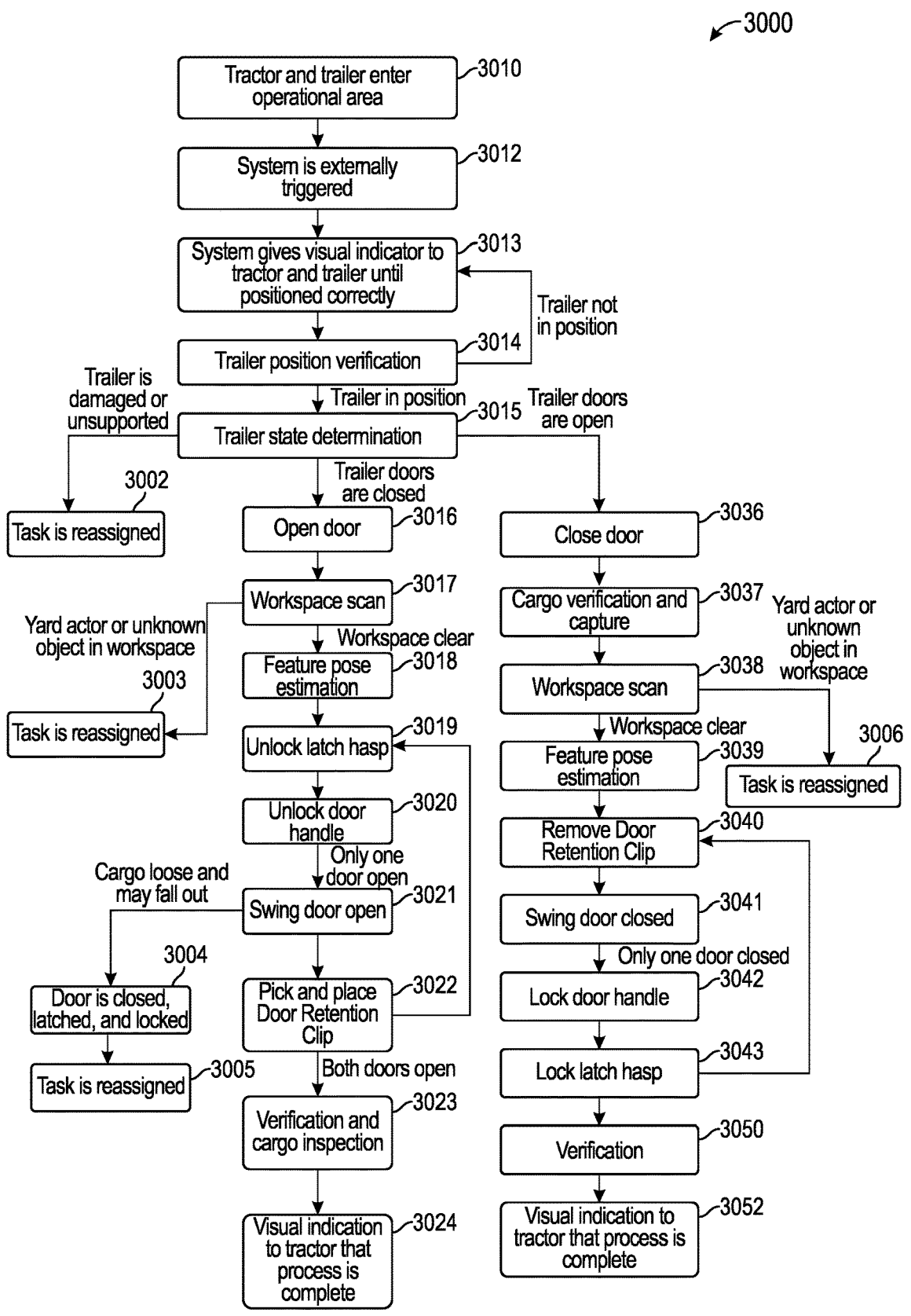
FIG. 30 is a flow diagram showing an overall procedure for door opening or closing using the station of FIG. 16.

FIG. 30 shows a flow diagram of an overall operational procedure performed by the door opening station 1600 according to an illustrative embodiment. In step 3010, either an autonomous yard tractor, manually driven yard tractor, or over-the-road tractor enters the operational area with an attached trailer. This operational area can include either a strategically located pull-through station or a back-in station located at a dock door or along the side of the customer facility. In step 3012, utilizing a combination of sensing modalities including pressure sensors, LIDAR and radar sensors, and machine-learning driven cameras (or alternative sensors/processors), the system detects that a tractor and trailer have entered the operational area. The system uses algorithms to filter out false positives and, if a tractor and trailer have entered the OA with the correct intent, the system initializes. In the case that an autonomous yard tractor has entered the OA this step will not be necessary. The autonomous tractor and the system will have previously coordinated the goal of operating on the trailer door, and/or when the trailer is in position. In step 3013, once initialized, the system gives a visual and or audible indicator to the manual yard tractor or over the road tractor to inform tractor/trailer positioning. Utilizing the same set of pressure, LIDAR and radar, and camera sensors the system determines the position of the trailer (step 3014) within its workspace and notifies the manual yard tractor or over the road tractor if the positioning needs to change. Once the tractor and trailer are in position the system notifies the manual driver to stop and wait until all operations are complete. This notification to the manual driver can be provided by lights and/or other audible, visual or electronic notifications located adjacent to, or integrated on, the swing door opening system. In the autonomous case this step will be slightly altered in that the visual and or audible indicators will not be necessary. The system and autonomous tractor will intelligently coordinate positioning of the rear of the trailer and the door opening station utilizing a combination of sensing and localization modalities between the two systems.

In step 3015, utilizing deep-learning driven cameras and associated machine vision, the system determines the state of the trailer doors and locking mechanisms. If the trailer is damaged, if external padlocks are present, or if the trailer is an unsupported category, the operation is immediately reassigned (step 3002). If the trailer is supported, the system determines what type of operation is needed and proceeds down that state flow. For example, an additional operation can be identifying and clipping a seal (zip tie) on the door with a special scissor tool.

Door Open Operation:

In step 3016, utilizing LIDAR, radar, a 3D depth camera, and/or other sensor(s), the system verifies that the workspace is clear of any unknown actors or objects (step 3017). A medium-fidelity motion planning map is generated using this data. If there are objects detected in the workspace that would inhibit the safe opening of the trailer doors the system will immediately reassign the operation. A reassignment generally means that a manual truck/personnel is/are instructed that its doors cannot be opened or closed by the automated system, and the manual driver (or other responsible person) should open or close the system either with the trailer parked at the station, or by moving the trailer out of the operating area and operating the doors. In the case of an AV truck, the AV system can be instructed to wait for manual assistance or move the trailer to an area designated for additional manual assistance, such as near a guard shack or maintenance area; or in a staging area where other manual yard truck drivers can be instructed to open or shut the doors. Note also that this action can include emitting an audible alert to clear the area, and if objects are still detected after (e.g.) 10 seconds, the system immediately reassigns the operation. Additionally, the system can also be adapted to identify objects approaching the work area for safety purposes and cease operations until the work area is clear.

If the workspace is clear the operation will proceed.

In step 3017, utilizing deep-learning driven models and/or conventional computer vision algorithms, the system precisely classifies and determines a pose estimation for all relevant and important trailer door features. If an actor or unknown object is present in the workspace then the task is reassigned (step 3003). Note that this action can also include emitting an audible alert to clear the area, and if objects are still detected after (e.g.) 10 seconds, the system immediately reassigns the operation. Otherwise, the scan includes, but is not limited to: (a) a 6 degree of freedom (DOF) pose of the door and the door hinge rotation axis, (b) a 6DOF pose and rotation axis of the door lock rod, (c) a 6DOF pose and rotation axis of the door handle, and (d) a 6DOF pose and rotation axis of the latch hasp (step 3018).

In step 3019, the system's robotic manipulator interfaces with a tool via a tool changing interface and uses the tool to unlock the trailer door latch/hasp. The tool is either a unique tool designed specifically for the latch hasp unlocking/locking step, or can be a combined tool that handles latch hasp unlocking/locking, door handle unlocking/locking, swing door opening/closing, and door retention. The tool can be passive and achieve all described tasks via manipulator motion only. The tool can also include a combination of electro-mechanical or pneumatic actuators to achieve the same desired tasks. The tool may include various sensors to indicate the state of the operation.

In step 3020, the robotic manipulator uses either a separate unique tool or the same tool used during the previous step to unlock and open the door lock handle.

In step 3021, the robotic manipulator uses either a separate unique tool or the same tool used during the previous steps to swing the trailer door open. During this operation the system intelligently monitors the force required to open the trailer door. The system uses this force feedback data to determine whether loose cargo is present inside the trailer and at risk of falling out during the door opening operation. If loose cargo is present and at risk of falling, the system will close the door (step 3004), lock the door handle and latching hasp, and reassign the operation (step 3005).

If the previous steps were performed using the universal door retention clip tool, then the manipulator will subsequently place the clip on the trailer to hold the door open. If the previous steps were performed with separate tools, the manipulator will then pick up a door retention clip, and place it on the trailer to hold the door open. If the door has moved at all during clip pickup, the system may need to re-open the door using the clip before placement on the trailer (step 3022).

Steps 3019-3022 are then repeated for the other trailer door so that both trailer doors are opened.

Note that in an illustrative embodiment, the manipulator and tool maintain pressure on the door throughout the opening process to avoid any wind pushing the door back shut. This may also be achieved with "swing posts" or other mechanically maneuvered devices to hold the door open while the door clips are installed by the manipulator. As noted, the swing posts can also be actuated by a powered drive system according to various conventional arrangements—e.g. a motor driven belt, chain or gears.

In step 3023, the system uses (e.g.) AI/deep-learning driven models of conventional and/or custom arrangement to inspect and verify the cargo located inside the trailer. Images and results are transmitted to the customer/facility YMS system or to another standalone or interconnected computing process as described further below. Final verification is performed that the operation was completed successfully and that both doors are open and retained. The system can stow itself out of the way of the trailer and will enter stand-by until another operation is prompted. If the deep-learning models determine there is any irregularity during an inspection of the cargo inside the trailer, the information can be communicated through a wireless (e.g. LTE or WiFi) connection or wired connection to a computer, tablet or smartphone of personnel at the distribution to alert them.

In step 3024, the system visually, audibly, and/or electronically indicates to the yard tractor or over the road tractor the operation was complete and successful. The manual driver can then proceed out of the operational area and proceed to their specified dock door or parking spot. This step is not required in the autonomous use case.

Door Close Operation:

In step 3036, after determining trailer state in step 3015, the system engages in a door close operation. In step 3037, the system uses deep-learning driven models to inspect and verify the cargo located inside the trailer. Images and results are sent to the customer/facility user interface and/or the YMS system. In step 3038, utilizing LIDAR, radar, a 3D depth camera, or a combination thereof, the system conducts a scan, and verifies that the workspace is clear of any unknown actors or objects. A medium-fidelity motion planning map is generated using this data. If there are objects detected in the workspace that would inhibit the safe closing of the trailer doors the system will immediately reassign the operation (step 3006). If the workspace is clear the operation will proceed.

In step 3039, and at an appropriate time in the overall process (e.g. when the door(s) is/are closed), utilizing deep-learning driven models and/or conventional computer vision algorithms, the system precisely classifies and determines a pose estimation for all relevant and important trailer door features. This includes but is not limited to: (a) a 6DOF pose of the door and the door hinge rotation axis, (b) a 6DOF pose and rotation axis of the door lock rod, (c) a 6DOF pose and rotation axis of the door handle, (d) a 6DOF pose and rotation axis of the latch hasp.

In step 3040, the system precisely determines the 6DOF pose of the Door Retention Clip located on the trailer utilizing fiducial markers on the clips. The door retention clip is removed via robotic manipulator and placed back into inventory on the manipulator carriage.

In step 3041, the manipulator uses a unique tool or the universal door retention clip to swing the trailer door closed.

In step 3042, the manipulator then uses a unique tool or the universal door retention clip to close the door lock handle.

In step 3043, the manipulator uses a unique tool or the universal door retention clip to lock the trailer door latch hasp.

Steps 3040-3043 are repeated for the other trailer swing door.

In step 3050, final verification is performed that the operation was completed successfully and that both doors are closed and locked. The system will stow out of the way of the trailer and will enter stand-by until another operation is prompted.

In step 3052, the system visually or audibly indicates to the yard tractor or over the road tractor the operation was complete and successful. The manual driver can then proceed out of the operational area and proceed to their specified dock door or parking spot. Note that this step is not required in the autonomous use case.

V. Computer Interface and Control

Figure 31:
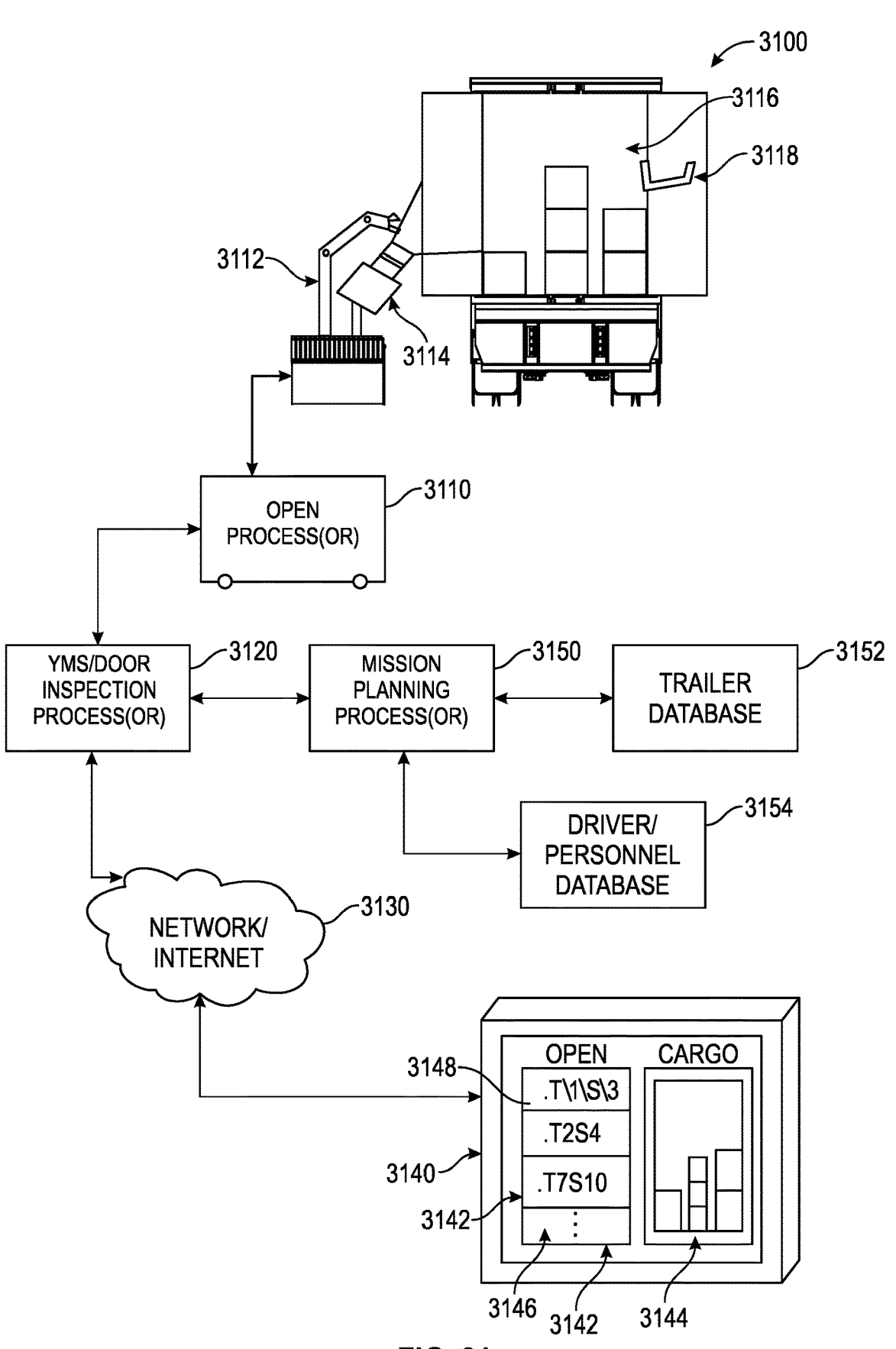
FIG. 31 is a schematic diagram showing the computer interface environment associated with the door open/close/inspection system of the illustrative embodiments.
Figure 32:
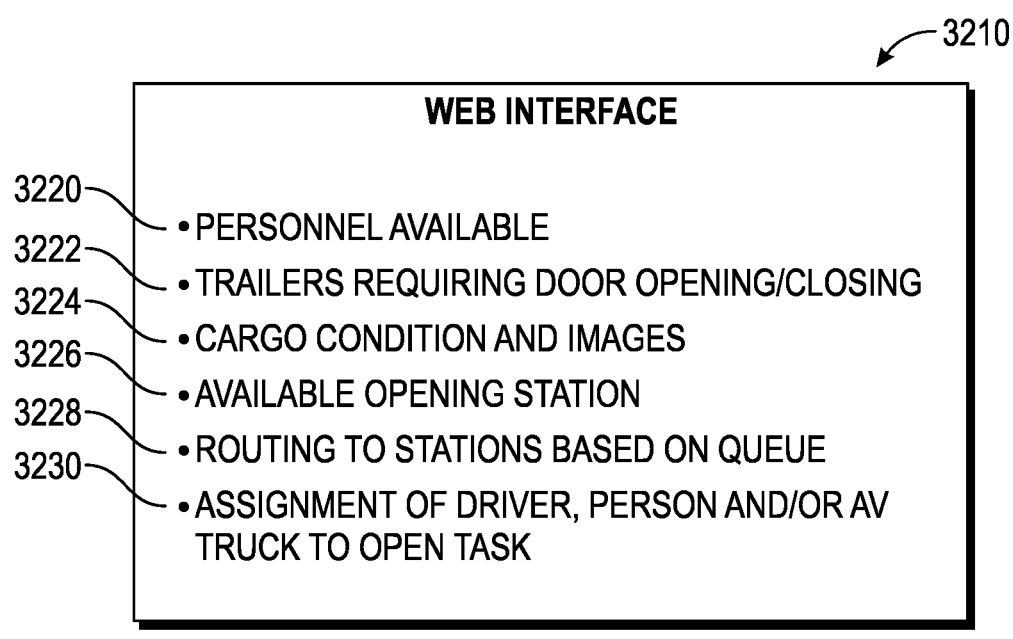
FIG. 32 is a block diagram showing various, exemplary functions and data handled by the interface system of FIG. 31.

Reference is made to FIGS. 31 and 32, which show a computing environment 3100, in which the door opening, closing and inspection system herein operate. The computing processes described herein can be instantiated on a variety of standalone and/or networked computing platforms with conventional and deep-learning computing processes— for example a commercially available neural network running trained classifiers. As shown, the above-described sled or other opening/closing/inspection platform 3110 with an on-board or distributed open/close process carries a manipulator (and other functions) 3112, as described above, includes a camera arrangement (2D, 3D, etc., and associated 3D sensors) 3114. An open or close signal is issued by the system (YMS and/or door open system 3120), and causes the camera to acquire one or more image(s) of the interior 3116 of the trailer 3118. This can be analyzed by the inspection process 3120, which can include trained image sets and a deep-learning process(or) that recognizes empty versus full trailers and proper versus improper loading. Notably, the image(s) and any status can be transmitted to a web interface via a LAN and/or internet link 3130 to an interface device 3140 used by the driver and/or other yard personnel.

By way on non-limiting example, the interface presents one or more page screens 3142 that contain relevant information on the truck—including a current or previous image (s) 3144 of the subject trailer 3118. Notably, a list of queued trailers to be opened/closed can be provided in pane 3146 on the interface screen 3142, including the highlighted present trailer 3148.

According to other embodiments herein, sensors and mission planning processes 3150 (interconnected with the facility's trailer database 3152, as well as a driver/personnel database 3154) identify if there is a queue of trailers waiting for automated door opening. The process can then instructs the manually or autonomously driver yard truck or OTR truck to proceed to a different door opening station with a smaller queue and/or instruct the manual driver to open or shut the doors manually if needed.

In a further embodiment, the web-based process herein can alert appropriate facility/yard personnel of the need to open or close a trailer which is being moved by an AV truck.

As described in various embodiments incorporated herein, the AV truck can include elevated platforms, posts, and the like having 2D and/or 3D sensors, cameras, etc. that are adapted to generate (e.g.) a 360 degree view to inspect the roof of trailers for issues, damage, etc., and report it to an appropriate trailer inventory and damage screen in the interface 3142 base, in part, upon the mission planning process(or) 3150 and other related processes. This trailer top status and associated trailer top images can be displayed along with cargo images/information as described above.

With brief reference to FIG. 32, the interface process 3210 can handle and present a variety of information to personnel and/or drivers as appropriate. This can include, but is not limited to: (a) available personnel to open/close doors and carry out other manual tasks (3220); (b) trailers requiring opening or closing of doors (3222); (c) cargo condition, presence/absence and relevant images (3224); (d) available opening stations/locations (3226); (e) routing to opening/closing/inspection stations based upon queue (3228); and/or (f) assignment to driver, person and/or AV truck to an open task (3230).

VI. Conclusion

It should be clear that the above-described system and method for opening and closing truck trailer swing doors provides an advantageous feature to both AV-truck-based and manually driven facilities. For an AV truck based facility, this invention facilitates the full automation of swing-door trailer movement, unloading and loading which otherwise is limited to roll-door style trailers or warehouses which have been built with "drive-through" dock doors that allow swing door opening on the inside of the warehouse. It allows for verification of load integrity and ensures safety by removing a time consuming and potentially hazardous task in a traffic-filled environment. Hence, the foregoing provides an effective implementation of a fixed or movable station that can be positioned behind the trailer to autonomously unlock, open, hold open and clip the trailer doors, using a sled with a manipulator, or any other rover, humanoid, dog robot, etc. that carries out such a task. As such, the illustrative embodiments provide the facility/yard with an ability to localize the trailer, unlatch the trailer with one or more tools, direct the movable sled/platform to open the door, and then the clip. Moreover, this robotically installed clip and associated mechanisms (e.g. swing posts) effectively avoids the need to apply traditional fixations to the door when open such as chains, hooks, cables, etc.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Also, qualifying terms such as "substantially" and "approximately" are contemplated to allow for a reasonable variation from a stated measurement or value can be employed in a manner that the element remains functional as contemplated herein—for example, 1-5 percent variation. Accordingly, this description is meant to be taken only by way of example, and not to otherwise limit the scope of this invention.

What is claimed is:

1. An apparatus for opening a swing door of a trailer comprising:

a station constructed and arranged to access and engage a rear of the trailer when the trailer is located with respect to the station;

a sled that moves transverse to a direction of trailer movement into and out of a position adjacent to the rear of the trailer so as to access and engage the rear of the trailer; and at least one robotic manipulator, mounted on the sled, including an end effector having a tool that engages, lifts and rotates a trailer lock rod handle to unlock the trailer lock rod, and the end effector having a tool that engages and swings the trailer door to an opened position.

2. The apparatus as set forth in claim 1, wherein the sled includes a camera assembly to locate features on the trailer door.

3. The apparatus as set forth in claim 2, wherein a camera is interconnected with a machine vison system that scans an interior of the trailer for cargo integrity.

4. The apparatus as set forth in claim 1, wherein the robotic manipulator is adapted to receive a plurality of tools on the end effector from storage on the sled.

5. The apparatus as set forth in claim 1, wherein the robotic manipulator is adapted to apply to, and remove from, the hinge line of the door, a door retention clip.

6. The apparatus as set forth in claim 5, wherein the door retention clip includes two opposing legs and an inside leg is thinner than an outside leg so as to avoid interference with cargo operations when applied to the hinge line.

7. The apparatus as set forth in claim 6, wherein the door retention clip includes (a) an interface for selectively engaging the robot manipulator, and (b) fiducials, located on a base between the opposing legs adapted to assist in identification and orientation of the door retention clip relative to the hinge line.

8. The apparatus as set forth in claim 7, wherein the door retention clip includes a tool to assist in lifting and rotating the trailer lock rod handle.

9. The apparatus as set forth in claim 8, wherein the tools on the door retention clip are located on one or both of opposing legs and include a magnet for engaging a hasp, and a hook for engaging the trailer lock rod handle.

10. The apparatus as set forth in claim 5, wherein the door retention clip is located on a rack of door retention clips provided on the sled.

11. The apparatus as set forth in claim 10, wherein the door retention clip includes a visible fiducial that is recognized by a camera assembly on the robotic manipulator.

12. The apparatus as set forth in claim 1, wherein the station includes a track to guide motion of the sled, and the sled is powered to move along the track.

13. The apparatus as set forth in claim 1, further comprising a moving post located on each of opposing sides of the trailer, the posts being arranged to move into and out of engagement with the trailer door in the open position so as to attach a door retention clip thereto.

14. The apparatus as set forth in claim 13, wherein the robotic manipulator is constructed and arranged to move each of the posts.

15. The apparatus as set forth in claim 1, wherein the robotic manipulator is a multi-axis robotic arm.

16. The apparatus as set forth in claim 1, further comprising a sensor assembly that determines a location of the trailer with respect to the station and signals at least one of (a) a driver of a manual truck and (b) an AV truck to stop.

17. The apparatus as set forth in claim 1, wherein the sled includes a plurality of robotic manipulators each constructed and arranged to perform a same task or to perform discrete tasks.

18. The apparatus as set forth in claim 14, wherein the robotic manipulator is a multi-axis robotic arm.

19. The apparatus as set forth in claim 18, wherein the robotic manipulator is adapted to apply to, and remove from, the hinge line of the door, a door retention clip.

20. The apparatus as set forth in claim 19, wherein the door retention clip includes two opposing legs and an inside leg is thinner than an outside leg so as to avoid interference with cargo operations when applied to the hinge line.

21. The apparatus as set forth in claim 20, wherein the door retention clip includes (a) an interface for selectively engaging the robot manipulator, and (b) fiducials, located on a base between the opposing legs adapted to assist in identification and orientation of the door retention clip relative to the hinge line.

22. A method for opening a trailer swing door comprising the steps of:

sensing, with a sensor, the trailer as it passes into a station;

moving a sled transverse to a direction of trailer movement into and out of a confronting position with the rear of the trailer; and operating at least one robotic manipulator, mounted on the sled, to unlock the trailer lock rod, and swing the trailer door to an opened position.

23. The method as set forth in claim 22, further comprising, operating the at least one robotic manipulator, mounted on the sled, swing the trailer door to a closed position and lock the trailer lock rod.

24. The method as set forth in claim 23, wherein the robotic manipulator is adapted to apply to, and remove from, the hinge line of the door, a door retention clip.

25. The method as set forth in claim 24, wherein the door retention clip includes tools to assist in lifting and rotating the trailer lock rod.

26. The method as set forth in claim 25, wherein the door retention clip includes two opposing legs and an inside leg is thinner than an outside leg so as to avoid interference with cargo operations when applied to the hinge line.

27. The method as set forth in claim 26, wherein the door retention clip includes (a) an interface for selectively engaging the robot manipulator, and (b) fiducials, located on a base between the opposing legs adapted to assist in identification and orientation of the door retention clip relative to the hinge line.

28. The method as set forth in claim 25, wherein the tools on the door retention clip are located on one or both of opposing legs and include a magnet for engaging a hasp and a hook for engaging a lock rod handle.

29. The method as set forth in claim 25, further comprising, picking and placing the door retention clip relative to a rack of door retention clips provided on the sled.

30. The method as set forth in claim 22, further comprising, determining, with the sensor, a location of the trailer with respect to the station and signaling at least one of (a) a
driver of a manual truck and (b) an AV truck to stop.

\* \* \* \* \*